United States Patent [19]

Wachtler

[11] Patent Number: 5,052,121

[45] Date of Patent: * Oct. 1, 1991

[54] TEMPERATURE-COMPENSATED QUANTITATIVE DIMENSIONAL MEASUREMENT DEVICE WITH RAPID TEMPERATURE SENSING AND COMPENSATION

[75] Inventor: William R. Wachtler, Solana Beach, Calif.

[73] Assignee: Albion Devices, Inc., San Diego, Calif.

[*] Notice: The portion of the term of this patent subsequent to Aug. 21, 2007 has been disclaimed.

[21] Appl. No.: 553,115

[22] Filed: Jul. 13, 1990

Related U.S. Application Data

[62] Division of Ser. No. 214,636, Jul. 1, 1988, Pat. No. 4,949,469.

[51] Int. Cl.[5] .............................................. G01B 7/12
[52] U.S. Cl. ................................... 33/813; 33/555.1; 33/702; 33/819; 33/DIG. 19; 364/562; 364/563
[58] Field of Search .............. 33/702, 827, 542, 542.1, 33/544, 555.1, DIG. 19, 504, 533, 558, 555.3, 820, 813, 819; 73/1 J; 374/1, 55, 56, 142; 364/571.03, 560, 561, 562, 563, 557

[56] References Cited

U.S. PATENT DOCUMENTS

| | | | |
|---|---|---|---|
| 1,196,789 | 9/1916 | Koelpin | 33/164 R |
| 3,594,909 | 7/1971 | Schultz | 33/125 T |
| 3,780,442 | 12/1973 | Gresho | 33/178 E |
| 3,808,696 | 5/1974 | Possati | 33/178 E |
| 3,921,300 | 11/1975 | Cox et al. | 33/125 T |
| 4,062,120 | 12/1977 | Lacagnina et al. | 33/166 |
| 4,141,149 | 2/1979 | George et al. | 33/125 T |
| 4,443,945 | 4/1984 | Takemura et al. | 33/1 PT |
| 4,561,185 | 12/1985 | Sakata et al. | 33/166 |
| 4,578,868 | 5/1986 | Sasaki et al. | 33/166 |
| 4,736,313 | 4/1988 | Nishimura et al. | 33/164 R |

OTHER PUBLICATIONS

Goodwin, L. E., "A Differential Transformer Gauge for Outside and Inside Diameters of Long Tubes", AEC Research and Development Report, Jan. 1958.
HP 5528A Laser Measurement System: Improve Machine Tool Productivity with Laser Calibration (Oct. 1989).

Primary Examiner—William A. Cuchlinski, Jr.
Assistant Examiner—Diego F. F. Gutierrez
Attorney, Agent, or Firm—Dressler, Goldsmith

[57] ABSTRACT

A computerized gauge measures dimensions, typically in the range of 6.1865" to 6.1917" accurate to ±0.001", typically the diameter of a steel railroad car axle. The gauge simultaneously senses the temperature, typically within a range of −20° F. to 100° F.+1° F., of the axle workpiece. In consideration of the predetermined coefficient of expansion of the workpiece, the gauge calculates the dimension that the workpiece would exhibit should it be thermally brought to a predetermined, 59° F. by convention, reference temperature. From the workpiece-temperature-compensated dimension resulting from such calculation, the axle may be recognized as being (i) oversized but repairable, (ii) within an acceptable size range, (iii) undersized but repairable, or (iv) undersized and unrepairable. The gauge may further sense its own temperature and, in consideration of another predetermined coefficient of expansion as besuits the gauge, calculate a gauge- and workpiece-temperature-compensated dimension. All temperature sensing is normally integral with the measurement process. Compensation for temperature-induced dimensional variation is typically at an accuracy that is (i) much less than those dimensional variations caused by deviations from reference temperature that are being compensated for, (ii) commensurate with other sources of measurement error, and (iii) typically within ±0.0001" for steel axles of 6+" diameter over a temperature range of greater than 100° F.

9 Claims, 4 Drawing Sheets

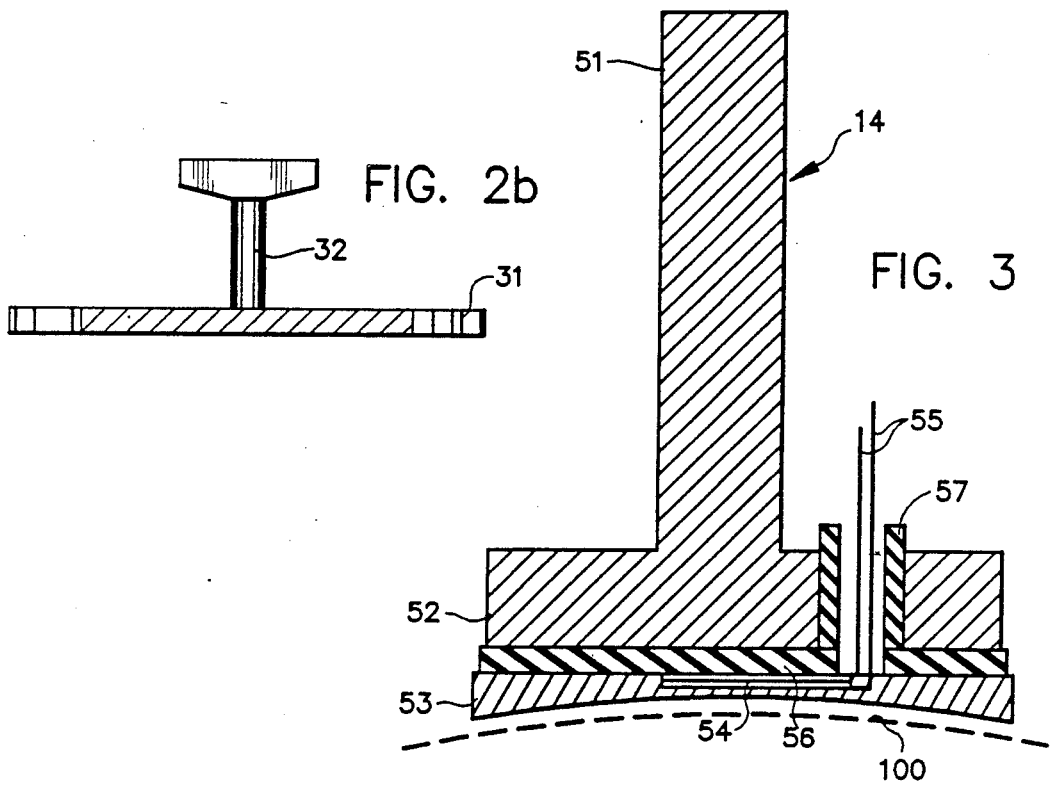
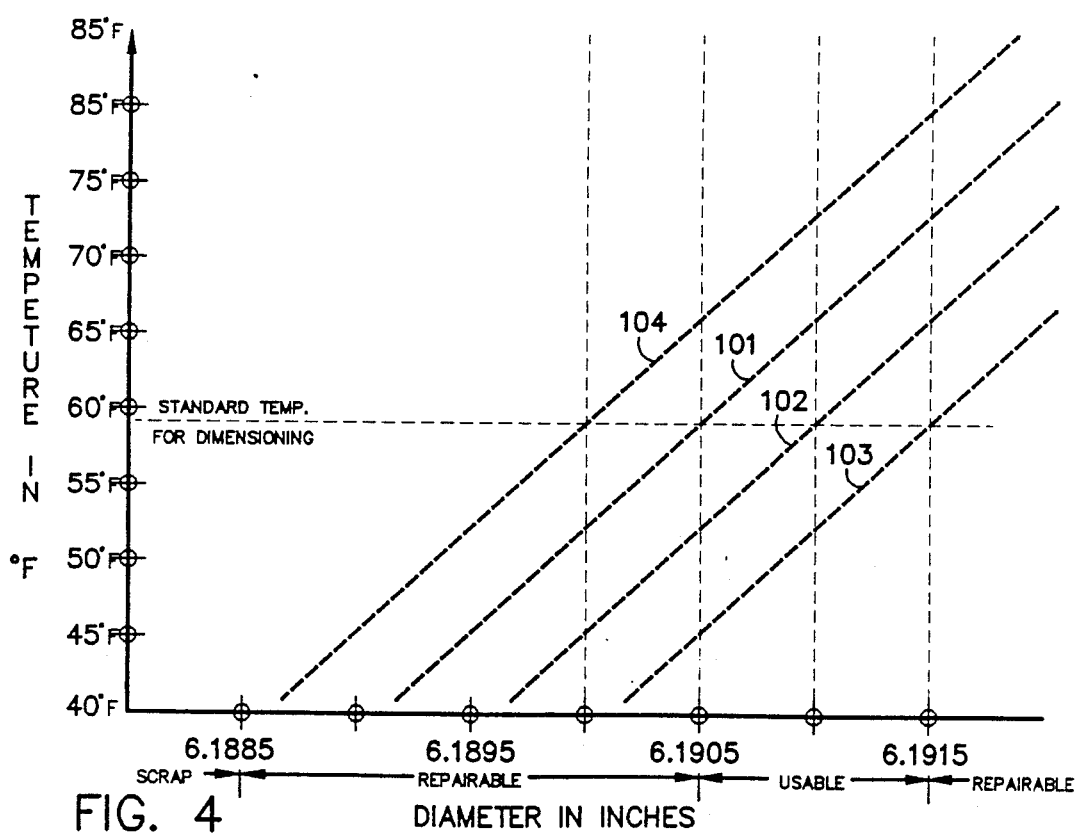

TEMPERATURE-COMPENSATED QUANTITATIVE DIMENSIONAL MEASUREMENT DEVICE WITH RAPID TEMPERATURE SENSING AND COMPENSATION

REFERENCE TO RELATED PATENT APPLICATIONS

This is a division of application Ser. No. 07/214,636 filed July 1, 1988, now U.S. Pat. No. 4,949,469.

BACKGROUND OF THE INVENTION

1. Field of the Invention

The present invention concerns the dimensional measurement of workpieces that undergo variations in dimension with changes in temperature. The workpieces are measured by gauges that themselves undergo variations in dimension with changes in temperature. The present invention more particularly concerns measurement systems that compensate for the temperature-induced dimensional variation of workpieces, and/or the temperature-induced dimensional variation of gauges, in measuring the dimensions of workpieces with gauges.

2. Background of the Invention 2.1 The Effect of Temperature on Dimensional Measurement It is known that certain materials, particularly metals, expand and contract with temperature. This expansion or contraction is normally expressed as a coefficient of expansion. Such a coefficient of expansion is expressed in terms of dimension per unit dimension per degree temperature. For example, a coefficient of expansion on the order of 0.000007 inches per inch per degree Fahrenheit is typical for certain ferrous metals.

Dimensional changes with temperature obviously mean that a metal workpiece does not measure the same dimensions at different temperatures. This makes it imprecise to determine the true, temperature-normalized, dimensions of the workpiece unless the workpiece is brought to a standard, reference, temperature. This standard, reference, temperature at which workpieces are measured is 59° F. by convention.

It is not always convenient to measure the dimensions of a workpiece while it is at the predetermined, reference, 59° F. temperature. The workpiece may be either hotter or colder than the reference temperature and may correspondingly exhibit expanded or contracted (or vice versa) dimensional measurements. If the accuracy of quantitative dimensional measurement, or the accuracy of qualifying a workpiece to some dimensional standard, is critical, then it is either necessary (i) to bring the workpiece to the predetermined, reference temperature at which the measurements may be performed, (ii) to compensate for the effect of the difference between the actual workpiece temperature and the reference temperature on the dimension(s) of the workpiece or (iii) to have a pre-determined dimensional reference "standard" that is both at the temperature of the part to be measured and that is also of the same material, and to measure the difference between the "standard" and the part.

If the workpiece has considerable thermal mass, and/or it is not readily subject to be adjusted in temperature, and/or a standard of identical material is not available, then it may be more efficient, or even mandated, that the workpiece should be measured at its existing temperature. That dimension which the workpiece would exhibit should it be brought to a predetermined, reference, temperature may then be calculated. This calculation requires knowledge of (i) the measured dimension, (ii) the workpiece actual temperature, and (iii) the thermal coefficient of expansion for the material of the workpiece.

2.2 Previous Temperature-Compensated Dimensional Measurement Systems

One previous example of a temperature-compensated dimensional measuring system is shown in U.S. Pat. No. 3,594,909 for an APPARATUS FOR MEASURING A DIMENSION OF A MEMBER to Schultz. The workpiece being measured is, for example, a wide-flange beam being formed in a rolling mill. The flange is measured while it is still near its rolling temperature of approximately six hundred degrees Fahrenheit (600° F.). The temperature-compensated dimensional measuring system taught within the Schultz patent obviates the need for permitting a sample piece of the beam to cool to room ambient temperature before its dimensions and/or symmetry may be checked for unacceptable deviations from normal. In the apparatus of Schultz, the temperature measurement means is a thermocouple probe. The probe contacts a workpiece that is elevated in temperature. A computer receives the signals from this probe and calculates the temperature-adjusted workpiece measurements. These measurements are, however, displayed only somewhat inexactly as a trace registered upon a strip recorder. Manual monitoring of the traces being recorded upon the strip recorder allows recognition of the conformity or nonconformity of the workpiece (typically a hot rolled I-beam) to symmetry and dimensional standards.

The previous temperature compensation of Schultz is primarily directed to producing and displaying an output signal representative of dimension upon a strip recorder when this output signal will be within a predefined range, and when the resulting trace will be observable for acceptable or unacceptable deviations within this range, regardless of variations in temperature of the workpiece for which dimension is being sensed. Schultz is concerned with checking I-beams for conformance with design standards; i.e., so that each I-beam will carry its design load and will mate with other I-beams of the same specification. Schultz is not concerned with dimensional measurement supporting the precision fitting of parts, as is the present invention.

Schultz is not concerned with precise quantitative dimensional measurement of a workpiece while the workpiece is at a displacement temperature from a predetermined, reference, temperature. Schultz is not concerned that a measured dimension may be converted to that temperature-normalized dimension which a workpiece would exhibit should it be brought to the reference temperature. The "compensation" of Schultz is basically an "accounting" for rather large dimensional deviations of a steel beam workpiece when it is still near its rolling temperature of about 1600° F.

The present invention is concerned with precise quantitative compensation of accurate (typically ±0.001 inches) dimensional measurements of a workpiece when the temperature of the workpiece over a wide range (typically 70° F. ±50° F.) is accurately known (typically within ±1° F.). The reason that the present invention is so concerned is not simply to garner measurement numbers. The present invention is directed to better enable a part "A" to mesh or fit into part "B". This simple concept is important. If at 59° F. a hole "A" is 2.0000±0.0001 inches in diameter, and if at the same 59° F. a shaft "B" of the same material is 1.9990±0.0001 inches in diameter, then the shaft will (and not just "should") fit within, and always fit within, the hole. It is of great benefit to know that things will mesh or fit together, and to know how well things will mesh or fit together, as hereinafter explained.

2.3 The Requirement for Temperature-Compensated Dimensional Measurement

The need for temperature-compensated quantitative dimensional measurement is greater than is commonly recognized. Commonly available measurement reference standards, typically ground steel, are accurate to ±0.00001 inch. The dimensions of some workpieces, such as the journals of railroad axles hereinafter discussed, are augmented by process of plating to accuracies of ±0.00005 inches. These same journals are diminished by process of machining to accuracies of ±0.0001 inch. (The journals may of course be machined undersize and plated back to a desired dimension.)

This degree of dimensional accuracy is common. Yet these accuracies are completely overwhelmed by any difference in workpiece temperature, and/or the temperature of the frame of the measuring tool that measures the workpiece, from a reference temperature. As mentioned, steel has a coefficient of expansion on the order of 0.0000068 inches per inch per degree Fahrenheit. Consequently, for workpiece larger than 1 inch an uncompensated temperature variation of 10° F. or more can be the single greatest source of measurement inaccuracy.

Uncompensated dimensional variation due to temperature variation has been, in the opinion of the inventor, a prime driver in the setting of dimensional standards to which larger mechanical parts such as journals and bearings are commonly constructed. The nominal ±0.001 inch tolerance to which these parts (such as railroad axles, discussed hereinafter) are sized is not the tolerance at which reasonably optimized, let alone best, mechanical wear performance is obtained. Mechanical wear of parts at tolerances of ±0.0001 inch is markedly better than at lessor tolerances, especially with modern lubricants. For example, automobile manufacturer Volvo of Sweden has gained a reputation for durability of automotive mechanical parts which may be due, in part, to the little-recognized fact that the parts of this manufacturer are reportedly machined to better dimensional accuracy than the Society of Automotive Engineers (SAE) standards followed by the domestic U.S. automotive industry.

If higher dimensional accuracies are beneficial, and realizable, then why are these higher accuracies not common? Why are the dimensional standards of industry so liberal? A primary cause as to why higher dimensional accuracies than current standards are not cost effectively realizable is the difficulty in cost effective accurate control of temperature. Accurate, ±1° F., control of ambient temperature is typically difficult and expensive. Worse, a tight control of ambient temperature does not invariably guarantee tight control of a workpiece temperature because the workpiece temperature may be affected by heats of machining and other processing. Finally, temperature stabilization of workpiece thermal masses takes time, and time is equivalent to cost in a production environment.

As well as the sensitivity of dimensional measurements of workpieces to temperature changes, it should be well understood that the gauges and tools of industry are themselves generally suffering much greater dimensional variation due to temperature change during use than any other single factor to which the gauges or tools are commonly subject. That the operative heads of drilling and milling machines change size with variation in their temperature is obvious. But even such tool faces as the cutter knife of machine that cuts veneer from a log are unexpectedly subject to undesirable change with temperature. A heat-expanded veneer cutter knife must cut a thicker wood veneer (else the cold knife would cut the veneer too thin), reducing the amount of veneer that can be produced from a log. Undesired dimensional variation with temperature change thus directly translates into reduced production of veneer. The veneer produced also exhibits an undesirable increased variability of thickness. This is but one of the more obscure of many examples that generally show that dimensional variation due to temperature change is an underecognized cost driver both during production and during life cycle use of the products produced.

2.4 An Example of a Dimensional Measurement Problem Strongly Affected by Temperature Variation One particular example of a workpiece upon which it is desired to obtain precise dimensional measurements while it is at a temperature differential from a predetermined, reference, temperature is the axle of a railroad car. The axle of a railroad car, typically made of steel, is both large and heavy. It exhibits a large thermal mass. The axles are normally received into an indoors test environment from the out-of-doors at temperatures which, in most regions of the country during most portions of the year, are distinctly neither at room temperature (typically 73° F.) nor the reference temperature (nominally 59° F.).

The dimensions of the axle must be determined at a reference temperature, nominally fifty-nine degrees Fahrenheit (59° F.). If the axles have become warmer or colder than this reference temperature by exposure to the environment, then a delay of many hours, or days, would be encountered if the axles were to be permitted to thermally stabilize at a 59° F. ambient temperature.

Because of these problems with temperature stabilization of railroad car axles, the axles are typically not quantitatively measured, but are rather only compared to a reference gauge, or "Jo", block. The Jo block is of the identical material to the axle and is of a known dimension. This dimension is the nominal standard for the journal of a railroad car axle. A number of axles subject to comparison are equalized at the same temperature as the "Jo" block, typically at the room temperature of the test environment. The temperature equalization is normally aided by fans that blow air over both the "Jo" block and the axles for an extended period, typically overnight.

In order to compare the axles a snap gauge measurement tool is first zeroed to the "Jo" block. The tool is then used to measure a plus (+) or minus (−) size differential of an axle. The process continues with repetitive rezeroings and measurements. Ultimately the tolerances of the axles relative to the "Jo" block are known even if the precise quantitative dimensions of the axles are only but imperfectly known.

The utility of comparing an object to be undersize or oversize relative to a reference is not as useful as knowing the exact, temperature-normalized, dimensions of such object. For example, the diameter of an axle of a railroad car is typically desired to be quantitatively measured to within ±0.001 inch. This accuracy in measurement is necessary to determine whether axles are (i) repairable to be within required normal dimensional range, (ii) issuable for use by being qualified to be within normal dimensional range, or (iii) subject to scrappage for being of unrepairable dimensions. Typically, a railroad axle larger than 6.1915 inches in diameter is too large, but repairable. An axle diameter between 6.1915 and 6.1905 inches is within the acceptable tolerance range. An axle diameter between 6.1885 and 6.1905 inches is slightly too small, but normally repairable. An axle diameter below 6.1885 inches is unsuitable for repair or subsequent use.

The stringent requirement that the axle of a railroad car should exhibit a diameter of 6.190 plus or minus 0.0005 inches is due to the fact that dimensional mismatch between the axle and its bearing can result, at the high loads to which railroad cars are subject, excessive rolling friction. Such rolling friction results in thermal build-up and possible catastrophic failure of the axle and/or axle bearings. In the extreme case this can result in derailments. It is believed that as many as 60% of the catastrophic failures of railroad car bearing axle assemblies may be traceable to out of tolerance bearing race or axle journal conditions.

Meanwhile that the relatively large railroad car axle must be measured very precisely, each change in temperature of this axle of twelve degrees Fahrenheit (12° F.) causes a variation in the shaft diameter of approximately 0.0005 inches, or fully one-half of the total 0.001 inch tolerance range within which the axle must be dimensionally qualified! (Explicitly, 6.190 inches ×0.0000068 inches per inch per °F.×12° F.=0.0005051.)

Without temperature-compensated measurement, it is obviously necessary not only that an axle should be brought approximately to the predetermined, reference measurement temperature, but that, indeed, the axle should be brought very precisely to this temperature. The aforementioned dimensions are those that the standard railroad axle must exhibit at precisely fifty nine degrees Fahrenheit (59° F.). It is hard to make a large thermal mass railroad car axle assume, and hold, this precise temperature. Accordingly, some axles are sent for rework, and some are even rejected, incorrectly. Conversely, and more detrimentally, certain axles for which the dimensions are improper may otherwise be certified for use.

Accordingly, the precise measurement of large, dimensionally thermally sensitive objects such as railroad car axles with high quantitative accuracy typically requires performing and reperforming the measurement process. Typically, a railroad car axle is measured several times before a confidence level can be developed that the correct measurements have actually been registered. This is obviously inefficient. Additionally, it is unsound safety practice that the measurement process should be so extremely dependent upon temperature variation that a difference in the temperature of the workpiece of a mere 48 degrees Fahrenheit (48° F.) (corresponding to the difference between 6.1905 inches and 6.1885 inches) might cause an axle that is correctly subject to permanent scrappage to instead be issued directly for use without rework! An improved device for the quantitative dimensional measurements of workpieces that are dimensionally sensitive to temperature change is required.

SUMMARY OF THE INVENTION

The present invention contemplates compensating for the dimensional change of a workpiece, or of a gauge, or of both a workpiece and a gauge, with changes in temperature about a predetermined reference temperature during dimensional measurement of the workpiece with the gauge. The compensation is computed in consideration of predetermined dimensional sensitivity(ies) of the workpiece, of the gauge, or of both the workpiece and the gauge, to changes in temperature.

Devices and methods in accordance with the invention produce a workpiece-temperature-compensated, a gauge-temperature-compensated, or a workpiece- and gauge-temperature-compensated calibrated dimensional measurement of a workpiece by a gauge when neither the workpiece, nor the gauge, nor both the workpiece and gauge are at the reference temperature. Neither are the workpiece and gauge necessarily at the same temperature.

Those dimensional variations with temperature that are successfully and accurately compensated for during dimensional measurements in accordance with the present invention are typically a large, and often a largest, source of measurement error during many dimensional measurements of diverse workpieces with diverse gauges. Large measurement error due to uncompensated dimensional change of workpieces with temperature is especially true of workpieces that are large, that exhibit large thermal coefficients of expansion (or contraction), or that are of temperatures much different from 59° F. Large measurement error due to uncompensated dimensional changes of gauges with temperature is especially true of gauges that are large, that exhibit large thermal coefficients of expansion (or contraction), or that are of temperatures much different from 59° F.

The accuracy of the compensation performed by the present invention is essentially dependent only on (i) the accuracies of certain temperature sensing(s) and (ii) a correct knowledge of certain pertinent thermal coefficient(s) of expansion. The compensation accuracy is typically very high, relegating errors in dimensional measurement that are due to temperature deviation to magnitudes at or below other sources of measurement error. This simple concept is of great significance in the real world. To repeat, the accuracy of the compensation performed in accordance with the invention is typically so good as to make dimensional measurement accuracy to be primarily dependent upon the accuracy of gauge blocks and calibrated gauges, and not upon the temperatures of gauge blocks, gauges, and/or workpieces.

In accordance with a first aspect of the invention, a workpiece-temperature-compensated dimensional measuring device includes a gauge for measuring a dimension of a workpiece. The gauge typically includes a dimensional measurement assembly (such as a dial indicator) moving relative to frame by contact with the workpiece. The gauge quantitatively measures a workpiece dimension, typically its outside or its inside diameter. Three point snap gauge, rocker gauge, and other common gauge configurations are suitably employed.

The device further includes a first thermal sensor, typically a thermistor. The thermal sensor is preferably held by the gauge in thermal communication with the workpiece. It measures the temperature of the workpiece as a first temperature.

The device further includes a computer, preferably a digital computer and typically a microcomputer. The computer receives the dimension measurement from the gauge and the first temperature measurement from the first thermal sensor. In consideration of a predetermined first dimensional sensitivity of the workpiece to temperature variations about a predetermined reference temperature, the computer computes the temperature-compensated dimension that the workpiece would measure to and by the selfsame gauge upon such times as the workpiece was to be at the predetermined, reference temperature.

The workpiece-temperature-compensated dimension is optionally displayed, typically by a digital display.

In accordance with still another, second, aspect of the invention, the workpiece-temperature-compensated dimensional measuring device may be further adopted so as to compensate for its own dimensional self-variation with temperature. In this case the device further includes a second thermal sensor, typically an active semiconductor electronic temperature sensor. The second thermal sensor is in thermal communication with the gauge for measuring its temperature as a second temperature.

In this case of compensating for the gauge temperature the computer further receives the second temperature measurement from the second thermal sensor. The computer now calculates, in further consideration of a predetermined second dimensional sensitivity of the gauge to variations in temperature about the predetermined reference temperature, that temperature-normalized dimension that the workpiece would measure to and by the selfsame gauge upon such times as both it and the gauge were to be at the predetermined reference, temperature.

The first and second aspects of the invention can be reversed. Each of gauge-temperature-compensation and workpiece-temperature-compensation can be performed independently and exclusively of the other.

The temperature-compensated dimensional measuring device in accordance with the invention is typically integrally packaged. It is easy to calibrate and use, particularly because all temperature sensing(s) typically transpire in a manner that is preferably completely integrated with the dimensional measurement process. The dimension and temperature sensings, and the necessary calculations, are fully automated and rapid. The device reads to the operator much like a digital readout gauge, yet it is capable of controllably displaying all parameters and sensed data by which it derived the temperature-compensated measurement.

The temperature-compensated dimensional measuring device in accordance with the present invention particularly enables predetermination of the fit of workpiece components with accuracies that have not been attainable previously without a significant expenditure of time and manpower.

BRIEF DESCRIPTION OF THE DRAWINGS

FIG. 3 is a detailed view, partially in crosssection, showing a shoe assembly and a temperature sensor that are within the first embodiment of the temperature-compensated dimensional measuring device shown in FIG. 1.

FIG. 4 is a graph showing a typical variation of dimension with temperature due to a coefficient of expansion of four common steel workpieces, typically the axles of railroad cars.

DESCRIPTION OF THE PREFERRED EMBODIMENTS

Figure 1:
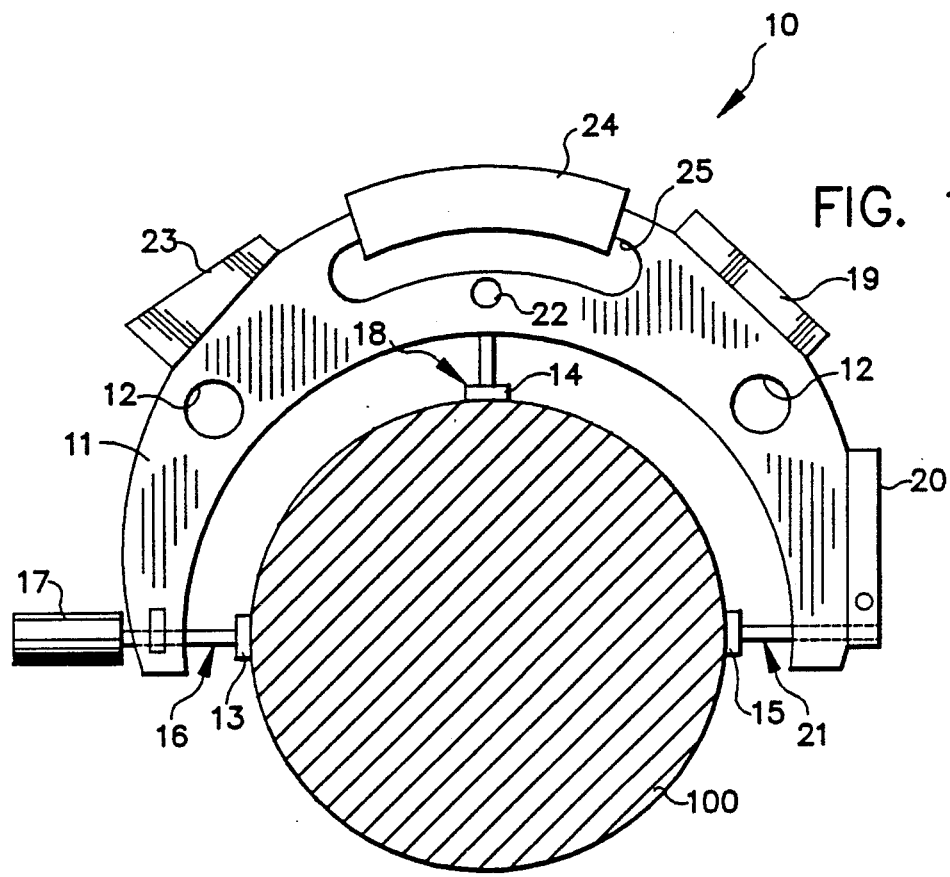
FIG. 1 is a diagrammatic view showing a first embodiment of a temperature-compensated quantitative dimensional measurement device in accordance with the present invention, particularly for measuring the outside diameter of a workpiece.

A first embodiment of a temperature-compensated quantitative dimensional measurement device in accordance with the present invention, particularly for measuring the outside diameter (OD) of a workpiece, is mechanically diagrammatically illustrated in FIG. 1. All components of the first embodiment of the temperature-compensated measuring device 10 are typically mounted to frame 11, but need not invariably be so mounted. The frame 11, typically made of metal and more typically aluminum, is in the shape of a "C" clamp. The frame 11 typically defines one or more lightening holes 12.

During use of the device 10 for measuring, the frame 11 is positioned about the outside diameter (OD) of workpiece 100. The frame 11 fixes shoes 13 and 14 in contact with the workpiece 100 at substantially one quadrant, or 90°, of separation along the circumference of the substantially cylindrical workpiece 100. The frame 11 also supports a third, moveable, shoe 15 in a position contacting the workpiece 100 at substantially 180° from fixed shoe 13. The 3 point suspension of frame 11 by its shoes 13-15 positioned against workpiece 100 constitutes the commonly recognized form of a three point snap gauge.

The shoe 13 is fixed to frame 11 during use of device 10 for measuring, but is adjustable relative to frame 11. The shoe adjustment assembly 16 includes micrometer 17. The micrometer 17 is manually rotated to force via a threaded shaft (not shown) the shoe 13 into greater or lesser extension from frame 11.

The shoe 14 is positionally constantly fixed to frame 11. The shoe 14 is but part of a positioning shoe and workpiece temperature sensor 18. The positioning shoe and workpiece temperature sensor 18, which will be shown in detailed view in FIG. 3, detects the temperature of workpiece 100 at the position of shoe 14 when the measuring device 10 is operatively positioned thereabouts. An electrical signal bearing information on this detected temperature is electrically communicated (by a wire pathway not shown in FIG. 1) to computer 19.

The moveable measuring shoe 15 is moveable relative to frame 11. It is mechanically connected to size signal generator 20 which is affixed to frame 11. The moveable measuring shoe 15 size and signal generator 20 jointly constitute the dimensional measuring assembly 21. The dimensional measuring assembly 21 produces an electrical signal that bears information on the displacement of moveable shoe 15 by workpiece 100. This signal is received (by a wired interconnection path not shown in FIG. 1) at computer 19. The magnitude of the displacement of moveable shoe 19, and the informational content of the electrical signal produced by dimensional measuring assembly 20, is, of course, indicative of the size of workpiece 100 relative to frame 11. Accordingly, the dimensional information produced by dimensional measuring assembly 21 is the outside diameter of workpiece 100 measured relative to frame 11.

The frame temperature sensor 22 produces an electrical signal that indicates the temperature of frame 11. This signal is received (by a wired interconnection path not shown in FIG. 1) by computer 19.

In accordance with the present invention, the computer 19 uses the measured workpiece dimension information received from dimensional measuring assembly 21 in combination with either or both of (i) the workpiece temperature information received from positioning shoe and workpiece temperature sensor 18 and (ii) the frame temperature information received from frame temperature sensor 22. The computer 19 computes a workpiece-temperature-compensated OD of workpiece 100, a frame-temperature-compensated OD of workpiece 100, or a workpiece-and frame-temperature-compensated OD of workpiece 100.

The dimensional compensation resultant from the temperature deviation of the workpiece 100, of the frame 11, or of both the workpiece 100 and frame 11 from the predetermined reference temperature of 59° F is calculated in computer 19 from prior knowledge of the predetermined thermal coefficient(s) of expansion of the workpiece 100 and/or the frame 11. Neither the temperatures nor the predetermined thermal coefficients of expansion of workpiece 100 and frame 11 are necessarily equal. Indeed, the frame 11 and the entire temperature-compensated measuring device 10 is usually near room ambient temperature for having been maintained in the (typically) indoor environment of use. The workpiece 100 may, to the contrary, be at a temperature significantly different from room ambient temperature. Likewise, the frame 11 is typically aluminum exhibiting a considerably different thermal coefficient of expansion from the workpiece 100 which is typically steel.

The temperature-compensated dimension calculated by computer 19 is further communicated for use, such as for use by a human operator or by a machine control system. It is typically communicated by a wired interconnection (not shown in FIG. 1) to display 23. The display 23, which is typically digital, displays the temperature-compensated dimension within a few seconds after the temperature-compensated measuring device 10 has been placed in stable mechanical and thermal contact with the workpiece 100. The computer 19 will not produce a display until sensed dimensions and temperature have stabilized.

The first embodiment of the temperature-compensated measuring device 10 in accordance with the present invention is typically positioned into mechanical and thermal contact with the workpiece 100 by being manually grasped about insulator 24 at the location of hand hold 25. The insulator 24 serves to diminish heat transfer from the human hand to the frame 11 during use of the measuring device 10 for temperature-compensated measurements. A slow variation in the temperature of frame 11 due to heating from the hand or from any other source is not harmful, especially in consideration of the compensation preferably to be performed by the device 10 for any thermally induced expansion or contraction of the frame 11. However, the insulator 24 primarily serves to prevent that the frame 11, especially if it is small and/or of low thermal mass and/or at a much different temperature than the hand, should receive sufficient heat transfer from the operators hand so as to undergo such a rapid change in temperature as would prevent the temperature-compensated measurements of the device from properly settling.

The mechanical and electrical interrelationships and interconnections of the components of the temperature-compensated measuring device 10 deserve careful consideration. The dimension measured by dimensional measuring assembly 21 is always relative to frame 11. Therefore dimensional measuring assembly 21, and the micrometer adjustment assembly 16 against which dimensional measuring assembly 21 acts through workpiece 100, must always be affixed to frame 11.

In accordance with the design of a three-shoe snap gauge, a fixed shoe 14 will also be affixed to the frame 11. However, it is not necessary that the temperature sensing that is preferably done within the shoe 14 as part of the positioning shoe and workpiece temperature sensor assembly 18 must necessarily be performed within such shoe 14, or that such temperature sensing needs be performed at any fixed location relative to frame 11 or device 10. Indeed, the temperature sensing of the workpiece 100 could be remote. The action of the preferred embodiment of the temperature-compensated measuring device 10 that the temperature sensing by positioning shoe and workpiece temperature sensor 18 should inur naturally upon such times as the device 10 is positioned about workpiece 100 for measuring the dimensions thereof is obviously a beneficial feature of the present design.

It should further be understood that it is properly the temperature of frame 11 that is being sensed by frame temperature sensor 22, and that it is principally the expansion or contraction of frame 11 that is being compensated for by computer 19. The temperature of dimensional measuring assembly 21 is not directly sensed, but is normally at the temperature of frame 11. The dimensional measuring assembly 21, while undergoing some small dimensional variation with temperature, generally incurs a dimensional variation with temperature that is so small relative to the greater variation resultant from the greater dimension of frame 11 so that this thermal variation of assembly 21 may be essentially neglected. Alternatively, it may be considered that the temperature sensitivity of dimensional measuring assembly 21 is incorporated into a single coefficient of expansion factor that is applied to both itself and frame 11 by computer 19.

Both computer 19 and display 23 are shown in FIG. 1 to be nominally affixed to frame 11. These components need not be, of course, integrally mounted to temperature-compensated measuring device 10. It is merely convenient that they should be so miniaturized and so mounted. In the preferred first embodiment illustrated in FIG. 1 the entire temperature-compensated measuring device 10 is a unitary, self-contained, instrument.

Figure 2A:
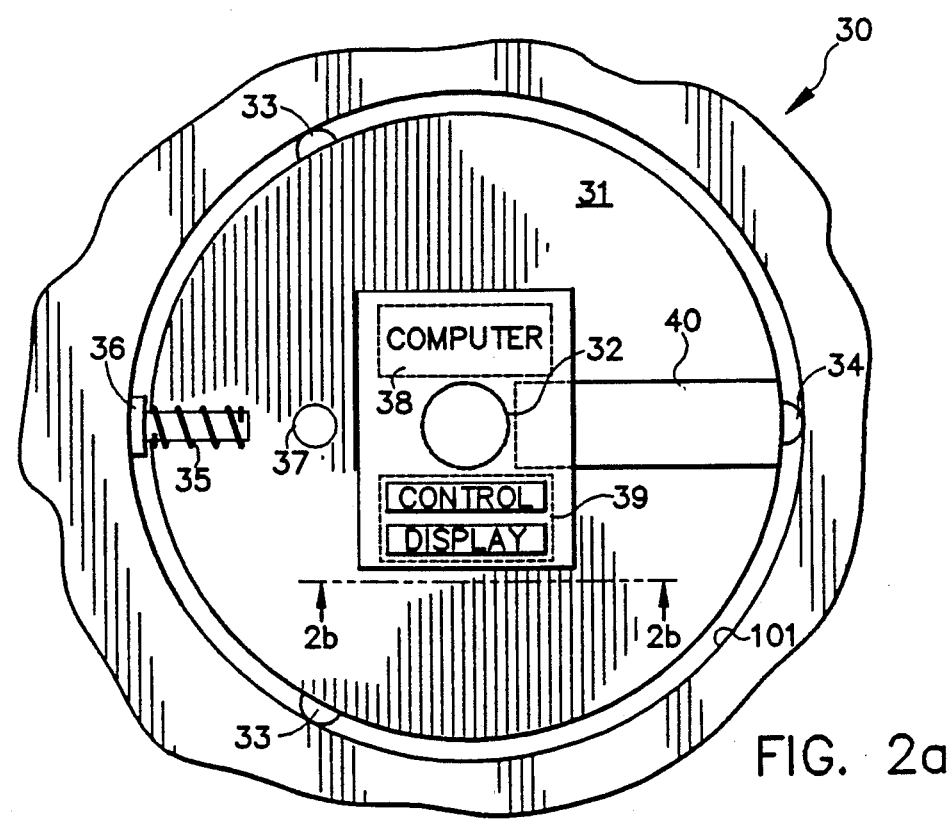
FIG. 2 is a diagrammatic view showing a second embodiment of the temperature-compensated quantitative dimensional measurement device in accordance with the present invention, particularly for measuring the inside diameter of a workpiece.

A second preferred embodiment of the temperature-compensated measuring device in accordance with the present invention is shown in FIG. 2, consisting of FIG. 2a and FIG. 2b. The temperature-compensated measuring device 30 is configured as a rocker gauge assembly having a substantially planar base 31 and a central handle 32. The handle 32 is grasped by the hand. Then dimensional measuring device 30 in the configuration of a rocker assembly is positioned within the bore of workpiece 101 so that the two fixed positioning feet 33 and the one moveable positioning foot 34 come into contact with the interior surface of the bore. Under the well understood principles of a rocker gauge assembly, the measuring device 30 is rocked from side to side in the bore of workpiece 101 until a minimum dimensional measurement is obtained.

Affixed to the base 31 and extending therefrom under the outwards force provided by spring 35 is a moveable temperature sensor 36. The temperature sensor 36 senses the temperature of the workpiece 101 at the interior of its bore. Meanwhile, another temperature sensor 37 senses the temperature of the base 31. Electrical signals from both temperature sensors 36 and 37 are routed (via pathways not shown in FIG. 2a) to a computer 38. The computer 18 is typically located in an enlarged top to the handle 32. Also within the enlarged top to handle 32 is a display 39.

The positional movement of moveable foot 34 relative to base 31 incurred during rocking of measuring device 30 within the bore of workpiece 101 produces an electrical signal output from dimensional measurement assembly 40. This signal output is indicative of the positional displacement of moveable foot 34, and consequently of the inside diameter (ID) of the bore to workpiece 101. As with the first embodiment of the invention shown in FIG. 1, the dimensional measurement assembly 40 measures dimensions relative to a frame, mainly base 31.

In accordance with the principles of the present invention, the computer 38 is preprogrammed with the thermal coefficients of expansion of both base 31 and workpiece 101. The computer 38 uses the temperature reading of workpiece 101 that is derived from temperature sensor 36 and the dimension that is derived from dimensional measurement assembly 40 in consideration of a predetermined thermal coefficient of expansion of workpiece 101 in order to derive a workpiece-temperature-compensated dimensional measurement.

The computer 38 preferably also uses the temperature of base 31 that is obtained from base temperature sensor 37 in conjunction with the same dimensional measurement of dimensional measurement assembly 40, and in further consideration of a predetermined thermal coefficient of expansion of the base 31, to derive a base-temperature-compensated dimensional measurement. The computer 38 preferably derives a compensated temperature measurement that is both workpiece- and base-temperature-compensated. The calculated temperature-compensated dimensional measurements are typically displayed by computer 38 (via wired interconnection not shown in FIG. 21) in display 39.

An expanded view, partially in cross-section, of the positioning shoe and workpiece temperature sensor assembly 18 previously shown in FIG. 1 is shown in FIG. 3. A support 51 is permanently affixed to frame 11 (shown in FIG. 1). The support 51 terminates in a widened lower base, or shoe, 52. The face 53 to shoe 52 is contoured in a complementary fashion to workpiece 100 in order to make good thermal contact. The face 53 to shoe 53 is made from highly thermally conductive material. It is typically made from metal and more typically silver.

A temperature sensor 54, typically a thermistor, is embedded within the typically silver face 53 to shoe 52. Electrical connection to the thermistor 54 is obtained via leads 55.

Backing the thermally conductive face 53 and the thermistor 54 is a layer of thermal insulator 56. At the region of the passage of leads 55 through shoe 52 the leads are protected by a grommet 57, typically made of neoprine rubber, that is both thermally and electrically insulating.

The preferred construction of the positioning shoe and workpiece temperature sensor 18 provides that the thermistor temperature sensor element will rapidly attain the temperature of the workpiece 100 (shown in FIG. 1) into which it comes into thermal contact. Meanwhile, the insulating layer 56 and the insulating grommet 57 prevent heat from being transferred between workpiece 100 and support 51 and frame 11 (shown in FIG. 1).

A conceptual analysis of the environment within which the temperature-compensated measurement devices in accordance with the present invention suitably function is aided by reference to the graph of FIG. 4. The variation of dimension with temperature for three typically workpieces, mainly three steel railroad car axles, 101–104 is graphed in FIG. 4. Because each of the workpieces 101–104 is of the same steel material, type 4340 by example, the slope of each curve is identical. Because the material of the axle workpieces 101–104 is homogenous, the plots are simple straight lines. The slope of these lines is the coefficient of expansion.

The suggested workpiece axle 101 is of minimum acceptable size and passes through the point of dimension 6.1905 inches at the reference temperature of fifty-nine degrees Fahrenheit (59° F.). Note that this axle 101 also measures to be good, or usable, by an uncompensated measurement taken at normal room temperature 70°–73° F.

The axle workpiece 102 is suggested to be "perfect" in dimension, and exhibits a diameter of 6.1910 inches at the reference temperature of fifty-nine degrees Fahrenheit (59° F.), meaning that it is precisely in the center of the acceptable range of axle diameters. Note that this axle 102 erroneously measures too large (but repairable) by uncompensated measurement at high room temperature.

The axle 103 exhibits a maximum acceptable diameter of 6.1915 inches at the same reference temperature of fifty-nine degrees Fahrenheit (59° F.). Even though this axle 103 is acceptable and usable as is, it is erroneously identified as oversize by uncompensated dimensional measurement at room temperature 70°–73° F.

Finally, the axle 103 is repairable but undersize. It measures, however, to be acceptable by uncompensated dimensional measurement at room temperature. To issue this axle for use will mean that its journal loosely fits a standard bearing, with high potential for early, possibly catastrophic, failure.

Further in accordance with the teaching of FIG. 4, it is shown that each of the axles 101–104 exhibits a reduced dimension at temperature below the reference temperature. In fact, even the axle 102 which is "perfect" will appear to be outside the acceptable dimensional range, i.e. of less than 6.1905 inches diameter, when it is measured at temperatures below approximately forty-five degrees Fahrenheit (45° F.). Accordingly, the dimensional measurements actually performed on the axle workpieces 101–104 at temperatures other than the reference temperature of fifty-nine degrees Fahrenheit (59° F.) must be adjusted, or compensated, in order to correctly determine that diameter which each workpiece would assume should it have been elevated, and stabilized, to the reference fifty-nine degree Fahrenheit (59° F.) temperature.

The particular preferred algorithm in accordance with the method of the present invention for compensating for both the temperature of the workpiece and of the measuring gauge is as follows.

A deviation from standard may be defined as:

$$G_{Std} - G_{Wkpc} + (T_{Std} - T_{Wkpc}) \times X_{Wkpc} - (T_{GStd} - T_{GWkpc}) \times X_{Gage}$$

The result of this calculation is greater than one (1) if workpiece is larger than standard. Within the formula the expressions have the following meanings:

Std = Calibration standard sample of workpiece
Wkpc = the workpiece being measured
G = Dial Gage reading. The gage reading increases with increasing workpiece size.
$G_{Std}$ = Gage reading on standard
$G_{Wkpc}$ = Gage reading on workpiece
$T_{Std}$ = Temperature reading on standard
$T_{Wkpc}$ = Temp reading on workpiece
$T_{GStd}$ = Temp reading of gage frame when measuring standard
$T_{GWkpc}$ = Temp reading of gage frame when measuring workpiece
$X_{Gage}$ = amount of expansion per degree of gage frame (constant in the length and temperature units being used by the gage and temperature sensors).
$X_{Wkpc}$ = amount of expansion per degree of workpiece material The coefficients of expansion and contraction for metals and mixtures are available in the CRC Handbook of Chemistry and Physics, 65th Edition, available from CRC Press Inc., Boca Raton, Fla. Coefficients particularly usable for metals common of employment in both frames of the dimensional measurement device and the workpieces upon which such devices operate are contained at pages D187–D188.

Heat transfer rates of materials are likewise available in the same CRC Handbook of Chemistry and Physics, 65th Edition, at pages E11–E14. Such heat transfer rates are useful in calculating how long it takes the temperature sensors of the temperature-compensated measurement devices in accordance with the present invention to stabilize at a new temperature. These times represent programmed settling times, or time delays, during which the measurement device will not give an indication. Normally these times are only a few seconds. The measuring device in accordance with the present invention is fully self-protected by its programmed operation from attempting temperature-compensated measurement or temperatures that are changing "too fast", i.e., at rates that, in consideration of heat transfer rates, represent that substantial temperature stability has not been achieved. If temperatures of interest are not substantially stable then the measurement device will produce no indication rather than a confusingly wrong, or variable, indication.

Figure 5:
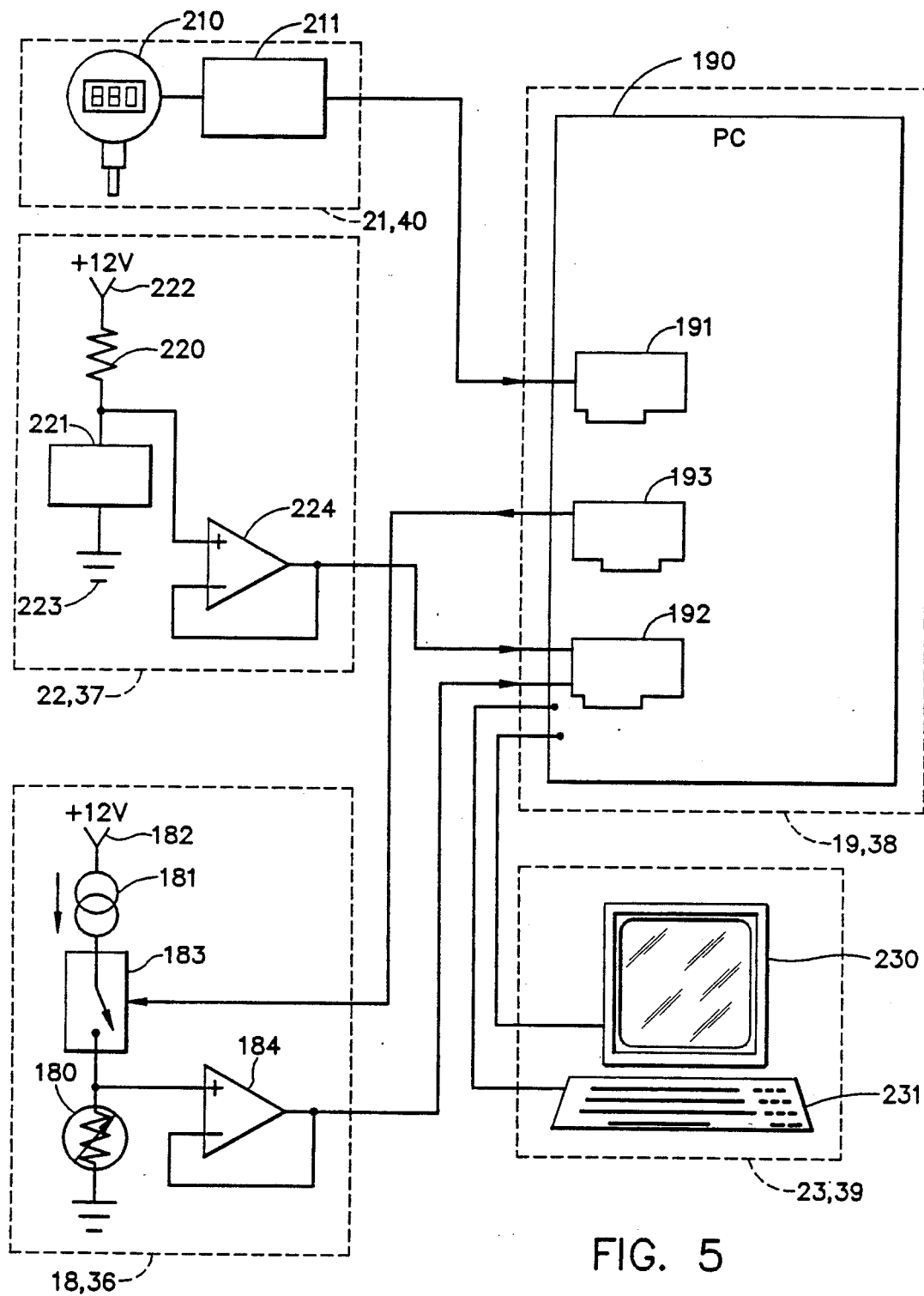
FIG. 5 is an electrical schematic showing a first embodiment of the electrical circuit which may be used within either, the first or the second, embodiment of the temperature-compensated dimensional measuring device in accordance with the present invention.
Figure 6:
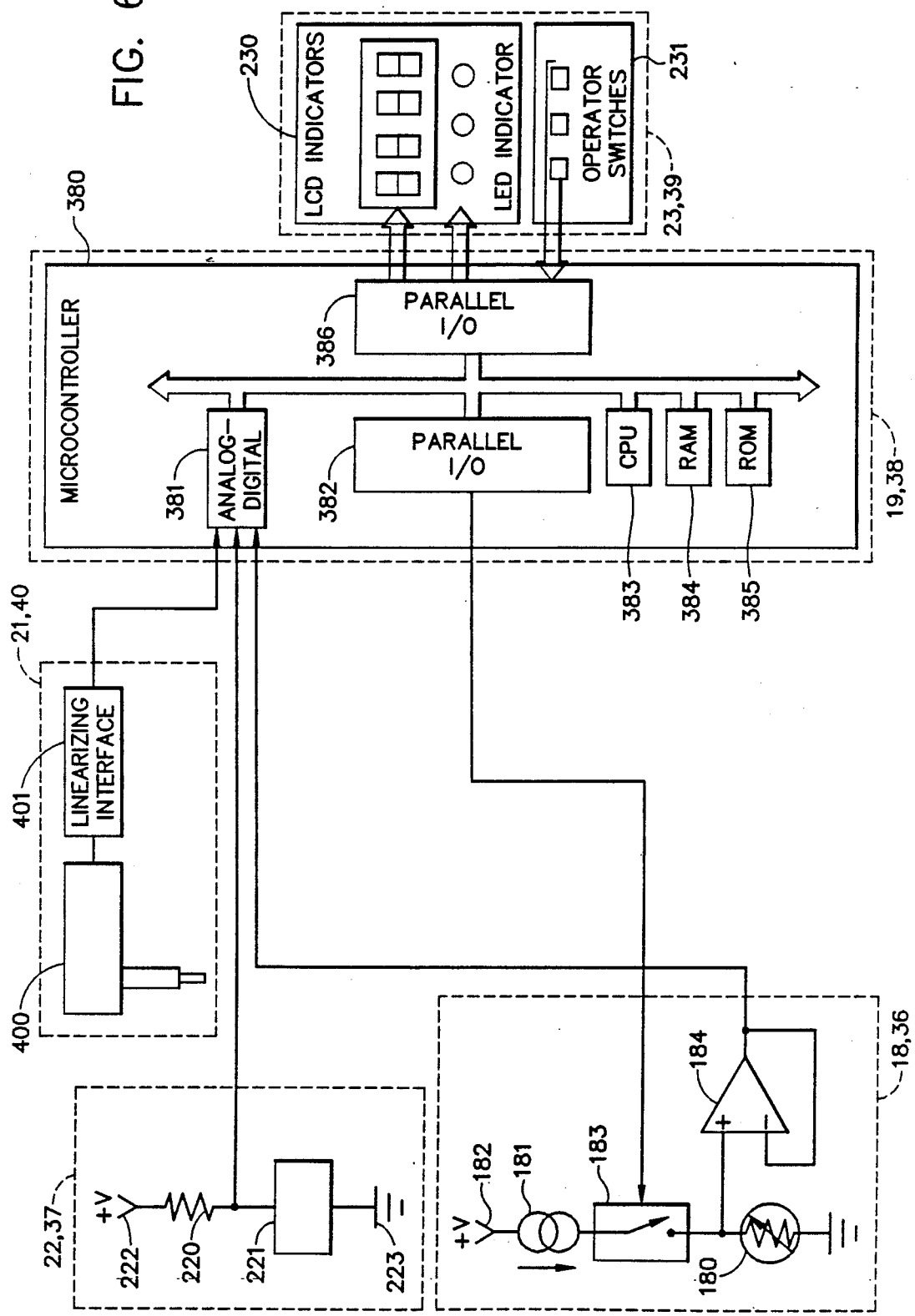
FIG. 6 is a schematic diagram showing a second embodiment of an electrical circuit which may be used within either, the first or the second, embodiment of the temperature-compensated dimensional measuring device in accordance with the present invention.

First and second preferred embodiments of electrical circuits suitable for incorporation in the temperature-compensated measuring device in accordance with the present invention are respectively shown in schematic diagram in FIGS. 5 and 6. Each of the circuits is suitable for inclusion either within the first mechanical embodiment of the temperature-compensated measuring device shown in FIG. 1, or within the second embodiment shown in FIGS. 2a and 2b. The first embodiment of the electrical circuit shown in FIG. 5 uses a personal computer 190 as the computer 19 or 38 respectively shown in FIG. 1 or FIG. 2a. The second embodiment of the electrical circuit shown in FIG. 6 uses a smaller microcontroller 380 as the computer 19 or 38 respectively shown in FIG. 1 or FIG. 2a.

Thus the first embodiment of the electrical circuit shown in FIG. 5 may be considered relatively physically larger whereas the second embodiment of the electrical circuit shown in FIG. 6 may be considered relatively physically smaller. If the first embodiment of the electrical circuit shown in FIG. 5 is to be directly affixed to the frame 11 or base 31 that are respectively shown in FIG. 1 or FIG. 2a, then the measuring devices 10, 30 must be correspondingly large. It is not, however, necessary that the computers 19, 38 should be respectively physically mounted to the respective frame 11 and base 31. It is merely convenient that the computers 19, 38 should be so mounted, and this mounting is best supported by the miniaturized embodiment of the electrical circuit shown in the schematic diagram of FIG. 6.

In the first embodiment of the electrical circuit shown in FIG. 5 the measuring assembly 21, 40 includes digital dial gauge 210, preferably Chicago dial type EDI-71 available from Chicago Dial Indicator Company, 1372 Rediker Road, DePlanes, Ill. 60016. The digital dial gauge 210 is connected to a dial gauge to RS232 interface 211. The interface 211 is preferably type Fowler Gage Port available from Observational Systems, Inc., 15014 N.E. 40th, Suite 201-B, Redmond, Wash. 98052. Other measuring assemblies 21, 40 producing a digital signal output indicative of the measured dimension are known in the industry, and will suffice within the temperature-compensated measuring devices of the present invention.

The signal output from interface 211 is received at an RS232C interface card 191 within personal computer 190. The information contained within the signal is the measured dimension of the workpieces 100, 101 (shown in FIG. 1 and FIG. 2a).

The frame, or base, temperature sensors 22, 37 (shown in FIGS. 1, 2a) are preferably implemented as active semiconductor circuits based on semiconductor temperature sensors. Such circuits and sensors have a rapid response time, and are highly sensitive to temperature variations. A resistor 220, nominally 10k ohms, is connected in series with semiconductor temperature sensor 221, nominally type LM335 available from National Semiconductor, between voltage supply 222, typically +12 volts dc, and ground 223. The signal derived at the junction of this voltage divider is received and amplified by operational amplifier 224. The amplified analog signal, indicative of the temperature of the frame 11 or of base 31 (respectively shown in FIGS. 1, 2a) is received at analog to digital converter 192 within personal computer 190.

The frame, or base, temperature sensors 18, 36 are typically implemented as a thermistor 180. The thermistor 180, typically type DC95 F502 W available from Thermometrics, 808 U.S. Highway 1, Edison, N.J. 08817 has a wide operational temperature range. It is durable to shock, vibration, and high temperature gradients normally encountered during operational use. Many additional commonly known thermistors are also suitable.

The thermistor 180 is within a constant current circuit of 0.1 milliamps established by constant current source 181. The constant current source 181 is powered by supply voltage 182, typically +12 volts dc. The circuit between constant current source 181 and thermistor 180 is enabled to be closed by a signal driven from personal computer 190 to close analog switch 183. Analog switch 183 is typically one leg of a CMOS switch type CD4066 (an industry standard part). The signal causing closing of the switch 183 is driven from the digital output lines circuit 193 within personal computer 190. When the switch 183 is enabled to be closed then the variable voltage developed across the variable resistance of thermistor 180 by the constant current flow (0.1 milliamps) therethrough is amplified in operational amplifier 184. The amplified signal is communicated to analog to digital interface 192 of personal computer 190. This signal bears information on the temperature of the workpiece.

From the received workpiece and frame (or base) temperatures, and in consideration of preprogrammed thermal coefficients of expansion as respectively besuit the material of the frame (or base) and the material of the workpiece, the personal computer 190 is able to calculate the workpiece- and frame (or base)-compensated-measurement of the workpieces 100, 101. The temperature-compensated dimensional measurement is displayed within display 230 of display and control 23, 39. The operator may cause the personal computer 190 to initiate a measurement cycle, alter the parameters of calculation, or perform other pertinent control via control area 231, typically a computer keyboard.

A listing in the BASIC language of a computer program particularly suitable for workpiece- and gauge-temperature-compensated measurement of a railroad axle is attached to the present specification as Appendix A. Preprogrammed constants include the following.

ThermCurrent = 0.1 milliamperes is the current of the thermistor thermally communicating with the workpiece.

ThermTDev = 1 is the maximum allowable deviation in degrees for a "stable" reading.

StableNReq = 5 is the length of time required in seconds for the measurement device to stabilize.

HandleFactor = 0.0005 inches per degree to add to reading, meaning the coefficient of expansion times the length of the gauge frame, per degree Fahrenheit.

AxleFactor = −0.000225 inches per degree to add to the dimensional reading, meaning the coefficient of expansion times the axle diameter, per degree Fahrenheit.

All these constants are obviously subject to predetermination as besuits the particular temperature-compensated measurement problem at hand.

The second embodiment of an electrical circuit suitable for use within either embodiment of the temperature-compensated measuring devices 10, 30 in accordance with the present invention is shown in FIG. 6. This circuit operates similarly to the embodiment of FIG. 5. The dimensional measuring assembly 21, 40 typically consists of displacement gauge 400 connected to a linearizing interface 401. The gauge 400 and linearizing interface 401 are both available from Technetics, Inc., 481 Cypress Lane, El Cajon, Calif. 92020. Unlike the digital dial gauge 210 and its accompanying dial gauge to RS232C interface 211 that were within the first embodiment of the electrical circuit shown in FIG. 5, the signal output of the linearizing interface 401 is analog, and not digital. This signal output is received within an analog to digital converter 381 that is integral to microcontroller 380. The microcontroller 380 is preferably type 68705 or 68HC11 available from Motorola, Inc.

The frame temperature sensor 22, 37 is again based on a semiconductor temperature sensor 370 type LM335. The operational amplifier 224 that was shown in FIG. 5 is not necessary for amplification of the electrical signal derived from sensor 370 during the signal transmission to microcontroller 380 because the microcontroller 380 is normally located physically proximate to the frame (or base) temperature sensors 22, 37.

The workpiece temperature sensor 18, 36, consist of the identical components 180–184 as were present within such workpiece temperature sensor within the first embodiment of the electrical circuit shown in FIG. 5. The signal output controlling the CMOS analog switch 183 is now derived from the parallel I/0 section 382 of microcontroller 380. The microcontroller 380 additionally contains central processing unit section CPU 383, erasable random access memory section RAM 384, and permanent random access memory section ROM 385.

In consideration of preprogrammed information regarding the thermal coefficients of expansion of both the frame (or base) 11, 31 and the workpieces 100, 101 (shown in FIGS. 1, 2a), and in further knowledge of the workpiece dimension and the frame and workpiece temperatures, the microcontroller 380 calculates the frame- and workpiece-compensated dimensional measurement. This measurement is transferred via parallel I/0 386 to display and control section 23, 39.

Within the miniaturized embodiment of the electrical circuit shown in FIG. 6, the display 230 preferably consists both of LCD indicators that are typically used for numerical display and of LED indicators that are typically used for display of the operational status of the temperature-compensated measuring device. The control of the temperature-measuring devices 10, 30 is preferably enabled through simple operator switches 231.

In operational calibration and use, the temperature-compensated measuring devices in accordance with the present invention exhibit considerable flexibility. That a measuring instrument should be calibratable, and calibrated, by such means as the micrometric adjustment assembly 16 shown in FIG. 1, is not new in the art. The temperature-compensated measuring devices 10, 30 in accordance with the present invention readily support zeroing or calibration relative to a reference dimensional standard by both mechanical means and by operator-initiated normalization, or zeroing, of the indicated dimension.

An initial, factory, calibration of a temperature-compensated measuring device 10, 30 is undertaken when its frame (or base) 11, 31 is at the 59° reference temperature and the instrument is dimensionally measuring a dimensional standard workpiece 100, 101, or Jo block. The measurement(s) of such dimensional standards are normally traceable to the National Bureau of Standards. Then, while the dimensional measuring instrument is still calibrated, two graphical plots are obtained. A first plot is the change in the absolute measurement of the measuring devices 10, 30 when the temperature of such devices is changed while the temperature of the Jo Block remains fixed at 59° F. The slope of such a curve is typically only the coefficient of expansion of the frame, or base, 11, 31. A second plot of the measuring devices 10, 30 measurements is obtained while the measuring devices 10, 30 remain calibrated at the 59° F. temperature while the Jo block varies in temperature. This variation with temperature exhibited by the Jo block is typically not the same variation as will ultimately be exhibited by the workpiece, being that the Jo block and the workpiece are not required to be made of identical material, and are normally made of different materials.

After deriving the two plots, it is possible to calibrate the temperature-compensated dimensional measuring devices 10, 30 in accordance with the present invention to the original calibration Jo blocks when either (i) the temperature-compensated measuring device, (ii) the Jo block, or (iii) both the temperature-compensated measuring device and the Jo block are not at the reference 59° F. temperature. This calibration flexibility is extremely valuable. For example, a temperature-compensated measuring device in accordance with the present invention may typically be switch controlled to indicate its own sensed temperature, the sensed temperature of the workpiece Jo block, or the uncompensated measurement that it currently senses. Suppose it is known from the calibration curves that a Jo block of diameter 6.0004 inches at 59° F. will measure 6.0011 inches at 70° F. Suppose that it is also known that a temperature-compensated measuring device 10, 30 that is zeroed to read the 59° F. Jo block to be 6.0004 inches when the measuring device 10, 30 is at the same 59° F. temperature will measure the same 59° F. Jo block to be 5.9996 inches when the frame (or base) 11, 31 of the measuring device 10, 30 is at 73°.

Consider now the calibration procedure for a temperature-compensated measuring device when its own sensors indicate that a Jo block is at 70° F. and that its own frame is at 73° F. The temperature of the Jo block indicates that the correct reading should be 0.0007 inches high, whereas the temperature of the frame (or base) indicates that the reading should be 0.0008 inches low. The net of these two pieces of information is that a 73° F. temperature-compensated measuring device measuring a 70° F. Jo block (which Jo block is 6.0004 inches at 59° F.) should read, if calibrated, 6.0005 inches. Suppose then, upon a singular instance, the temperature-compensated measuring device 10, 30 in accordance with the present invention shows an uncompensated dimensional measurement of the Jo block equaling 6.0006 inches. This reading is too high by 0.0001 inches. The device is correspondingly manually calibrated, either by mechanical adjustment or by input of parameters to the computer processor, to subtract 0.0001 inches from the workpiece Jo block measurement that it senses. The device 10, 30 thusly thinks that it sees, and displays as the uncompensated measurement, a dimension of 6.005 inches for a 70° F. Jo block and a 73° F. frame. From this uncompensated measurement the device will derive a workpiece- and self-temperature compensated measurement of 6.0004 inches—which is the true Jo block measurement.

The temperature-compensated dimensional measuring device was calibrated without necessity of having adjusted either its own temperature, or the temperature of the Jo block, to the reference temperature of 59° F. This flexible calibration obviously saves time and permits a frequent recalibration in the work environment.

In accordance with the preceding discussion, it should be recognized that many alterations and adaptations of the temperature-compensated measuring devices in accordance with the present invention are possible. If dimensional sensitivity of the workpiece to variations in temperature is not particularly acute, and/or is accommodated by other means than temperature compensation of dimensional measurements, then it would be possible to operate the device in accordance with the present invention to compensate only for its own frame (or base) temperature. Conversely, if the temperature-compensated dimensional measuring devices in accordance with the present invention are dimensionally so small that their own dimensional variations with temperature are inconsequential, and/or are made out of materials that are highly dimensionally stable with temperature variation, and/or are always operated at an identical temperature, then these devices could be used to compensate only for the temperature of the workpiece and not additionally, as is preferable, for the temperature measurement of the devices themselves.

As well as the possibility of using the devices of the present invention by parts in a reduction of their preferred capacity, it is obviously possible, once a flexible computational computer is employed, to extend to still other factors the temperature compensation that is employed in accordance with the principles of the present invention. Particularly, compensation for variations with temperature might be employed for more than just the frame (or base), 11, 31 and the workpieces 100, 101. This additional compensation might relate to second order effects, or to the non linearities within the temperature-measuring devices themselves. The computers might be employed not merely to perform calculations as besuit substantially linear coefficients of expansion, but to match indicated temperatures and dimensional measurements against predetermined mappings in order to calculate a best fit of observed conditions to prior data in order to determine true dimensions.

The present invention is also suitable for incorporation within a closed loop control system during machining or other processing operations wherein processing operations are controlled in consideration of workpiece dimension, machine head position, or like dimensional measurements. It will be understood that the compensation performed by the present invention is, under computer control, substantially continuous. The continuous compensation can account for continuing variations in any of the dimension or the temperature of the workpiece, or the temperature of the measuring device.

This suitable expansion of the present invention deserves careful deliberation. For example, when a workpiece is being turned on a lathe the heat generated in the turning process flows in both directions from the cutting tool. The heat which goes toward the already formed part is of no consequence (other than it may act as a thermal barrier to the heat being generated by the cutting tip). The heat contained within the removed shavings is likewise of no consequence. The heat transferred toward the uncut section is of concern because it is expanding the part dimensionally. The cutting tip typically moves parallel to the centerline of the machine. Because of its thermal expansion the part is cut on a taper which is more pronounced the closer to the end of the cut. The reason for this is because the transfer of heat from the metal to the air at the end of the part is significantly slower than internal heat transfer in the metal. If the sensing and compensation in accordance with the present invention are used to move the cutting tool so as to compensate for the heat changes in the material being formed then the end prouct may be made significantly more dimensionally accurate. In many cases this increase in accuracy would eliminate any requirement(s) for secondary processing. Therefore the expansion of the present invention into active process control systems is contemplated.

In sensing the dimension or temperature of the workpiece it should be understood that such sensing need not be by direct physical contact. Even if the dimension of a workpiece were to be measured relative to a frame by a noncontact method such as reflected light, then the temperature variations of the workpiece could still be pertinent to the determination of the workpiece true dimension. The temperature of a workpiece may be determined by sensing the infrared radiation emissions therefrom, and need not exclusively be determined by physical contact with the workpiece.

In consideration of these and other possible adaptations and modifications of the present invention, the present invention should be interpreted in accordance with the scope of the following claims, only, and not solely in accordance with those preferred embodiments within which the invention has been taught.

```
Program Wach2; {Wachtler temp compensated axle-ometer}
uses AuxInOut,crt,parallel,miscunit,screen,thtable;

Const
  ThermCurrent = 0.1; {ma}
  ThermTDev = 1;  {Maximum allowable deviation for "stable" reading}
  StableNReq = 5; {Length of Stable time required}
  HandleFactor = 0.0005; {inches per degree to add to reading}
  AxleFactor = -0.000225; {inches per degree to add to reading} var
  com1: text;
type
  st80 = string[80];

Procedure FootSwitch;
Var
  B: byte;
Begin
  B := 2;
  ParOut(1,B);
  Delay(20);
  B := 0;
  Parout(1,B);
End;

Procedure ReadGage(Var St:St80);
Var
  Ch: char;
Begin
  St:= '';
  Footswitch;
  Repeat
    Read(Com1,Ch);
    Case Ch of
    ^M,^Z:;
    else St := St+Ch;
    end; {case}
  Until Ch = ^M;
End;

Procedure InitGage;
{Initializes RS232 and footswitch}
Var S: st80;
```

```
Begin
  AssignAux(Com1,0,$83);
  Reset(Com1);
  ReadGage(S);
  ReadGage(S);
  ReadGage(S);
End;

Const
  DataPort = $221;
  ControlPort = $220;
  StatusPort = $220;

Procedure InitDT;
Var
  BH, BL, St: byte;
  Port[ControlPort] := 0;
  Delay(10);
  BH := Port[DataPort];
  BL := Port[DataPort];
End;

Procedure ReadDT(Ch:integer;Var Value:integer);
Var
  BH, BL, St: byte;
Begin
  Port[ControlPort] := 0 or (ch and $F);
  Repeat
    St := Port[StatusPort];
  Until (St and $20) = 0;
  BH := Port[DataPort];
  BL := Port[DataPort];
  Value := BH*16 + (BL shr 4);
End;

Procedure ReadTherm(Var Value: integer);
{Returns average A/D number for thermistor (channel 2)}
Const
  Reps = 10;

Var B: byte;
    VTot: real;
    N: integer;
Begin
  B := 1;
  ParOut(1,B);
  Delay(5);
  VTot := 0;
  For N := 1 to Reps do
  Begin
    ReadDT(2,Value);
    VTot := Vtot + Value;
  End;
  B := 0;
  Parout(1,B);
  Value := trunc(VTot / 10);
End;
```

```
Procedure ReadSnapT(N: integer;Var Value: integer);
Const Reps = 100;
Var
  RAccum: real;
  NN,R: integer;
Begin
  RAccum := 0;
  For NN := 1 to Reps do
  Begin
    ReadDT(N,R);
    RAccum := RAccum+R;
  End;
  Value := Round(RAccum/Reps);
End;

Procedure ExitStuf;
Begin
  Close(Com1);
End;

{---------------------------- Main ----------------------------}
Var
  Scrn: ScrType;
  ThermRes : real;
  N,R,RR, chan,Err,Hr,Mn,Sec,Frac,ThermIndex,StableN,TestIndex: integer;
  S: st80;
  P: ParseStringType;
  SnapV, ThermV: real;
  ThermT: array[0..59] of real;
  MinThermT, MaxThermT: real;
  Done, Quitt: boolean;
  State: (Idle,RHit,RefCap,MeasStable);
  RefGage, RefAxleT, RefHandleT: real;
  NowGage, NowAxleT, NowHandleT: real;
  DifAxleT, DifHandleT: real;
  SizeDifGage, SizeDifAxle, SizeDifHandle, CorrectSize: real;
  K: char;
begin
  ClrScr;
  WriteLn('---------- Initialize Wachtler Axle Meter ----------');
  WriteLn('Initializing serial and dial');
  InitGage;
  WriteLn('Initializing A/D');
  InitDT;
  WriteLn('Loading thermistor translation table');
  LoadTable;
  Delay(1000);
  WriteLn('Loading screen');
  LoadScreen('WachScrn',Scrn);
  SetupScreen(Scrn);

For N := 0 to 59 do ThermT[N] := -273;

{---------------------------- main loop ----------------------------}

State := Idle;
  Quitt := false;
```

```
Repeat
  {Read DOS Time}
  SysTime(Hr,Mn,Sec,Frac);
  ThermIndex := Sec;

Repeat
    ReadGage(S);
    P.Strg := S;
    Parse(P,' ',Err);
    If P.Como[2][1] = '-' then Insert('0',P.Como[2],2)
                          else Insert('0',P.Como[2],1);
    Val(P.Como[2],NowGage,Err);
    {GoTOXY(1,22);
    Write(P.Strg,' ',P.Como[2],' ',NowGage,' ',Err);}
  Until (Err = 0) or KeyPressed;
  {check key inputs}
  K := ' ';
  While KeyPressed do
  Begin
    K := ReadKey;
  End;
  K := upcase(K);
  Case K of
  'R':Begin
      State := RHit;
      End;
  'Q': Quitt := true;
  end; {case}

SnaoIV := 5 * RR / 4096;
  NowHandleT := 100 * SnaoIV - 273;

{ReadSnaoT(1,RR);
  Snao2V := 5 * RR / 4096;
  Snao2T := 100 * Snao2V - 273;
  GoTOXY(Labl[Snao2].X,Labl[Snao2].Y);
  Write(Snao2V:7:3);
  GoTOXY(Labl[Now].LX,Labl[Snao2].Y);
  Write(Snao2T:7:3);}

ReadTherm(R);
  RR := R;
  ThermV := 5 * RR / 4096;
  ThermRes := ThermV / ThermCurrent;
  Res2Temp(ThermRes,ThermT[ThermIndex],Err);

{check stability}
  done := false;
  StableN := 0;
  Repeat
    Inc(StableN);
    TestIndex := ThermIndex - StableN;
    While TestIndex < 0 do TestIndex := TestIndex + 60;
    If (ThermT[ThermIndex] > ThermT[TestIndex] + ThermTDev) or
       (ThermT[ThermIndex] < ThermT[TestIndex] - ThermTDev) then
    Begin
      done := true;
      stableN := StableN - 1;
    End;
```

```
Until done or (StableN > StableNReq);
NowAxleT := ThermT[ThermIndex];
If StableN > StableNReq then
Begin
  Case State of
   RHit: Begin
       State := RefCap;
       RefGage := NowGage;
       RefHandleT := NowHandleT;
       RefAxleT := NowAxleT;
     End;
   RefCap: State := MeasStable;
   End; {case}
End Else
Begin
  Case State of
   MeasStable: State := RefCap;
   end;
End;

Case State Of
Idle:Begin
    GXY(Scrn,1 ); Write('                                    ');
    GXY(Scrn,2 ); Write('        ');
    GXY(Scrn,3 ); Write(NowGage:8:4);
    GXY(Scrn,5 ); Write('    ');
    GXY(Scrn,7 ); Write(Snap1V:7:3);
    GXY(Scrn,10); Write('    ');
    GXY(Scrn,11); Write(NowHandleT:7:3);
    GXY(Scrn,12); Write('    ');
    GXY(Scrn,13); Write('    ');
    GXY(Scrn,15); Write(ThermV:6:3);
    GXY(Scrn,18); Write('    ');
    GXY(Scrn,19); Write(NowAxleT:5:1);
    GXY(Scrn,20); Write('    ');
    GXY(Scrn,23); Write(StableN:2);
  End;
RHit:Begin
    GXY(Scrn,1 ); Write('Measuring Ref, Awaiting Stable Temp  ');
    GXY(Scrn,2 ); Write('    ');
    GXY(Scrn,3 ); Write(NowGage:8:4);
    GXY(Scrn,5 ); Write('    ');
    GXY(Scrn,7 ); Write(Snap1V:6:3);
    GXY(Scrn,10); Write('    ');
    GXY(Scrn,11); Write(NowHandleT:5:1);
    GXY(Scrn,12); Write('    ');
    GXY(Scrn,13); Write('    ');
    GXY(Scrn,15); Write(ThermV:6:3);
    GXY(Scrn,18); Write('    ');
    GXY(Scrn,19); Write(NowAxleT:5:1);
    GXY(Scrn,20); Write('    ');
    GXY(Scrn,21); Write('    ');
    GXY(Scrn,23); Write(StableN:2);
  End;
RefCap:Begin
    SizeDifGage := NowGage - RefGage;
    DifHandleT := (NowHandleT - RefHandleT);
```

```
    DifAxleT := (NowAxleT - RefAxleT);
    SizeDifHandle := DifHandleT * HandleFactor;
    SizeDifAxle := DifAxleT * AxleFactor;
    CorrectSize := SizeDifGage + SizeDifHandle + SizeDifAxle;

GXY(Scrn,1 ); Write('Measuring Test Axle, Awaiting Stable Temp    ');
    GXY(Scrn,2 ); Write(RefGage:8:4);
    GXY(Scrn,3 ); Write(NowGage:8:4);
    GXY(Scrn,5 ); Write(SizeDifGage:8:4);
    GXY(Scrn,7 ); Write(SnapIV:6:3);
    GXY(Scrn,10); Write(RefHandleT:5:1);
    GXY(Scrn,11); Write(NowHandleT:5:1);
    GXY(Scrn,12); Write(DifHandleT:5:1);
    GXY(Scrn,13); Write(SizeDifHandle:8:4);
    GXY(Scrn,15); Write(ThermV:6:3);
    GXY(Scrn,18); Write(RefAxleT:5:1);
    GXY(Scrn,19); Write(NowAxleT:5:1);
    GXY(Scrn,20); Write(DifAxleT:5:1);
    GXY(Scrn,21); Write(SizeDifAxle:8:4);
    GXY(Scrn,23); Write(StableN:2);
    GXY(Scrn,26); Write(CorrectSize:8:4);
  End;
MeasStable:Begin
    SizeDifGage := NowGage - RefGage;
    DifHandleT := (NowHandleT - RefHandleT);
    DifAxleT := (NowAxleT - RefAxleT);
    SizeDifHandle := DifHandleT * HandleFactor;
    SizeDifAxle := DifAxleT * AxleFactor;
    CorrectSize := SizeDifGage + SizeDifHandle + SizeDifAxle;

GXY(Scrn,1 ); Write(CorrectSize:8:4,'                    ');
    GXY(Scrn,2 ); Write(RefGage:8:4);
    GXY(Scrn,3 ); Write(NowGage:8:4);
    GXY(Scrn,5 ); Write(SizeDifGage:8:4);
    GXY(Scrn,7 ); Write(SnapIV:6:3);
    GXY(Scrn,10); Write(RefHandleT:5:1);
    GXY(Scrn,11); Write(NowHandleT:5:1);
    GXY(Scrn,12); Write(DifHandleT:5:1);
    GXY(Scrn,13); Write(SizeDifHandle:8:4);
    GXY(Scrn,15); Write(ThermV:6:3);
    GXY(Scrn,18); Write(RefAxleT:5:1);
    GXY(Scrn,19); Write(NowAxleT:5:1);
    GXY(Scrn,20); Write(DifAxleT:5:1);
    GXY(Scrn,21); Write(SizeDifAxle:8:4);
    GXY(Scrn,26); Write(CorrectSize:8:4);
    End;
  End; {case}
  Until Quitt;
end.
Unit Screen; {for loading automatic screens}
interface
uses crt;

Type
  FType = record
    X: integer;
    Y: integer;
  end;
```

```
ScrType = record
  S: Array[1..25] of String[80];
  F: Array[1..200] of FType;
end;

Str255= String[255];

Procedure LoadScreen(FName:Str255; Var SS: ScrType);

Procedure GXY(SS:ScrType; FieldNum:integer);

Procedure SetUpScreen(SSS:ScrType);

implementation
{—————————————— implementation ——————————————}

Procedure LoadScreen(FName:Str255; Var SS: ScrType);
Var
  InStr,FieldStr: String[255];
  Fil: Text;
  N, NN, L, Line, ChCount, FieldX, Field, FieldI, Err: integer;
  FieldNum, EndOfFieldNum: boolean;

Begin
  {Initialize screen}
  For N := 1 to 25 do
  Begin
    SS.S[N] := '';
    For NN := 1 to 79 do
    Begin
      SS.S[N] := SS.S[N] + ' ';
    End;
  End;
  For N := 1 to 200 do
  Begin
    SS.F[N].X := 1;
    SS.F[N].Y := 1;
  End;
  Assign(Fil,FName);
  Reset(Fil);
  Line := 0;
  While Not EOF(Fil) do
  Begin
    Line := Line + 1;
    ....  ..  ..
   L := Length(InStr);
   ChCount := 0;
   FieldNum := false;
   EndOfFieldNum := false;
   For N := 1 To L do
   Begin
     Case InStr[N] of
      ' '..'/', ':'.. '(', '}'..#255:
        begin
          ChCount := ChCount+1;
          SS.S[Line][ChCount] := InStr[N];
          If FieldNum then
```

```
          Begin
            FieldNum := false;
            EndOfFieldNum := true;
          End;
        End;
      '|': Begin
          ChCount := ChCount+1;
          FieldNum := true;
          FieldStr := '';
          FieldX := ChCount;
          FieldY := Line;
        End;
      '0'..'9': Begin
          If FieldNum then
          Begin
            ChCount := ChCount + 1;
            FieldStr := FieldStr+InStr[N];
          End Else
          Begin
            ChCount := ChCount+1;
            SS.S[Line][ChCount] := InStr[N];
          End;
        End;
      End; {case}
      If (N = L) and FieldNum then EndOfFieldNum := true;
      If EndOfFieldNum then
      Begin
        EndOfFieldNum := false;
        FieldI := 1;
        Val(FieldStr,FieldI,Err);
        SS.F[FieldI].X:=FieldX;
        SS.F[FieldI].Y:=FieldY;
      End;
    End; {character loop}

End;
  Close(Fil);
End;

Procedure GXY(SS:ScrType; FieldNum:integer);
Begin
  GoToXY(SS.F[FieldNum].X,SS.F[FieldNum].Y);
End;

Procedure SetUpScreen(SSS:ScrType);
Var
  N: integer;
Begin
  ClrScr;
  For N := 1 to 25 do
  Begin
    GoTOXY(1,N);
    Write(SSS.S[N]);

Begin
  End.
```

```
unit AuxInOut;
interface
uses Dos;

procedure AssignAux(var F: Text; Port,Params: word);
implementation
{$R-,S-}
type
  AuxRec = record
          Port,Params: word;
          Unused: array[1..12] of byte;
        end;

procedure AuxInit(Port,Params: word);
inline($58/$5A/$B4/$00/$CD/$14);

function AuxInChar(Port: word): char;
inline($5A/$B4/$02/$CD/$14);

procedure AuxOutChar(Port: word; Ch: char);
inline($58/$5A/$B4/$01/$CD/$14);

function AuxInReady(Port: word): boolean;
inline($5A/$B4/$03/$CD/$14/$88/$E0/$24/$01);
{$F+} function AuxInput(var F:TextRec): integer;
var
  P:word;
begin
  with F,AuxRec(UserData) do
  begin
    P := 0;
    while AuxInReady(Port) and (P<BufSize) do
    begin
      BufPtr^[P] := AuxInChar(Port); Inc(P);
    end;
    BufPos := 0; BufEnd := P;
  end;
  AuxInput := 0;
end;

function AuxOutput(var F: TextRec): integer;
var
  P: word;
begin
  with F,AuxRec(UserData) do
  begin
    P := 0;
    while P < BufPos do
    begin
      AuxOutChar(Port,BufPtr^[P]); Inc(P);
    end;
    BufPos := 0;
  end;
  AuxOutput := 0;
end;

function AuxIgnore(var F: TextRec): integer;
begin
``` unit parallel;

{Parallel unit for handling parallel port}

{Model: This include file implements the following model:

Output: 2 ports known as 1 and 2. Port 1 is the regular data port, while port 2 uses wires which also may be used as input instead, so contention must be resolved. (See below);

Out Port 1
| Bit | DB25 pin |
|---|---|
| 0 | 2 |
| 1 | 3 |
| 2 | 4 |
| 3 | 5 |
| 4 | 6 |
| 5 | 7 |
| 6 | 8 |
| 7 | 9 |

Out Port 2
| Bit | DB25 pin |
|---|---|
| 0 | 1 |
| 1 | 14 |
| 2 | 16 |
| 3 | 17 |

Inout: 1 port
| Bit | DB25 pin |
|---|---|
| 0 | 1 |
| 1 | 11 |
| 2 | 12 |
| 3 | 13 |
| 4 | 14 |
| 5 | 15 |
| 6 | 16 |
| 7 | 17 |
} interface
Procedure ParInit;
Procedure ParIn(Prt: integer; Var Byt: byte);
Procedure ParOut(Prt:integer; Var Byt: byte);

implementation

Const
   Base = $378;

Procedure ParInit;
Begin
End;

Procedure ParIn(Prt: integer; Var Byt: byte);
Var
  B9,BA: byte;
  B: array[0..7] of byte;

```
function AuxOpen(var F:TextRec):    :ger;
begin
  with F,AuxRec(UserData) do
  begin
    AuxInit(Port,Params);
    if Mode =fmInout then
    begin
      InOutFunc := @AuxInout;
      FlushFunc := @AuxIgnore;
    end else
    begin
      Mode := fmOutout;
      InOutFunc := @AuxOutput;
      FlushFunc := @AuxOutput;
    end;
    CloseFunc := @AuxIgnore;
  end;
  AuxOpen := 0;
end;

procedure AssignAux;
begin
  with TextRec(F) do
  begin
    Handle := $FFFF;
    Mode := fmClosed;
    BufSize := SizeOf(Buffer);
    BufPtr := @Buffer;
    OpenFunc := @AuxOpen;
    AuxRec(UserData).Port := Port;
    AuxRec(UserData).Params := Params;
    Name[0] := #0;
  end;
end;
end.
   BA := Port[Base+2];
   B[0] := (BA AND 1);           {o   }
   B[1] := (B9 AND $80) SHR 6;   {pin 11}
   B[2] := (B9 AND $20) SHR 3;
   B[3] := (B9 AND $10) SHR 1;
   B[4] := (BA AND 2)  SHL 3;
   B[5] := (B9 AND 8)  SHL 2;
   B[6] := (BA AND 4)  SHL 4;
   B[7] := (BA AND 8)  SHL 4;

Byt := B[0] OR B[1] OR B[2] OR B[3] OR B[4] OR B[5] OR B[6] OR B[7];
   Byt := Byt XOR $93;
End;

Procedure ParOut(Prt:integer; Var Byt: byte);
Begin
  Case Prt of
  1: Begin {regular data output port}
       Port[Base] := Byt;
     End;
  2: Begin {extra output lines}
       Byt := (Byt XOR $B) AND $F;
       Port[Base+2] := Byt;
```

```
      End;
    End; {case}
End;

end. {of unit}

{MiscUnit.Pas}
unit Miscunit;
interface
uses crt,dos;

Const
   ScreenSeg = $B800;

Type
   Str255 = String[255];
   Str30 = String[30];
   Str80 = String[80];

KeyType = record
      Got: boolean;    {True if key fetched}
      ASCII: boolean;  {True if ASCII, False if KeyCode}
      ASCVal: Char;    {Has a value if ASCII, else 0}
      Code: Byte;      {Has a value if not ASCII, else 0}
      end;

Procedure ReadKbd(Var Key:KeyType; Mode: integer);

Function CapStr(Str: Str80):Str80;

Procedure RegularText;

Procedure DimText;

Procedure ReverseText;

Procedure BlackBack;

Procedure GreyBack;

Const
   MaxParseComp = 30;

Type
   ParseStringType = record
              Strg: str255;
              Comp: array[1..MaxParseComp] of Str30;
              QofComp: integer;
              end;

Procedure Parse(Var ParseString: ParseStringType;
                    SepString: Str30;
                    Var Error: integer);

Procedure GetChoice(Var Choic: char; Target: str80);

Procedure X(Flag: char);
```

```
Type
  FName= String[80];

Function Exist(FileName: FName): boolean;

Type RTSType= String[80];
            Fieldwidth:integer;
                HiLim:real;    {Smallest Large float 1Esomething}
                LoLim:real)    {Smallest small non-float 1Esomething}
                :RTSType;

Type DateType = String[8];

Procedure Date(Var Date:DateType);

Procedure SysTime(var Hr,Min,Sec,Frac:integer);

Procedure CursorOff;

procedure CursorOn;   { normal cursor attributes }

Procedure PutAtXY(X,Y: integer; Ch: char);

Function Squeeze(InStr:Str80):Str80;

Procedure ErrDo(Er: integer;S1,S2:Str255);

{—————————————————— implementation ——————————————————}
implementation

{Miscellaneous routines for:

- reading keyboard
 - string handling
 - capitalizing
 - reverse/normal text
 - on/off cursor
 - getting choice
 - file exist
 - real to string conversion
}
{—————————————————— ReadKbd ——————————————————}

{ReadKbd: Useful procedure for handling the keyboard}
{Turn off Control-C and Control-P checking}

Procedure ReadKbd(Var Key:KeyType; Mode: integer);
{Handles keyboard in variety of different modes, see KeyModeType
There are only 8 useful combinations of these, see Const % for details.}

{Returns the record Key, see KeyType above}

Type
  KbdModeType = record
    Wait: boolean;    {True means wait for key}
    ClrBuffer: boolean; {True means clear kbd buffer before reading}
```

```
    CtlCChk: boolean;   {True means halt program if Ctl-C struck}
    CtlSChk: boolean;   {True means if Ctl-S recvd, pause until another key,
                         which is trashed}
  end;
Var
  Ch,Ch2: char;
  KbdMode: KbdModeType;
Const
  M: array [1..8] of KbdModeType =
  {Debug off: ie: ^C check off}
  ((Wait:true;  ClrBuffer:false; CtlCChk:false; CtlSChk:false),  {Type/ChooseAhead}
   (Wait:true;  ClrBuffer:true;  CtlCChk:false; CtlSChk:false),  {Choose Slow}
  {Debug on: ie: ^C check on. Note these correspond to above + 4}
   (Wait:true;  ClrBuffer:false; CtlCChk:true;  CtlSChk:false),  {Type/ChooseAhead}
   (Wait:true;  ClrBuffer:true;  CtlCChk:true;  CtlSChk:false),  {Choose Slow}
   (Wait:false; ClrBuffer:false; CtlCChk:true;  CtlSChk:false),  {Interrupt}
   (Wait:false; ClrBuffer:false; CtlCChk:true;  CtlSChk:true));  {Int/Pause}

Begin
  CheckBreak := false;
  KbdMode := M[Mode];

Key.Got := false;
  Key.ASCII := true;
  Key.ASCVal := #0;
  Key.Code := 0;

If KbdMode.ClrBuffer and KeyPressed then While KeyPressed do Ch := ReadKey;
  If (not KeyPressed) and (not KbdMode.Wait) then Exit;

Repeat Until KeyPressed;
  Ch := ReadKey;
  Key.Got := true;
  If (Ch = #0) and KeyPressed then
  Begin               {extended key}
    Ch2 := ReadKey;
    Key.ASCII := false;
    Key.ASCVal := #0;
    Key.Code := Ord(Ch2);
  End Else
  Begin               {ASCII keys}
    Key.ASCII := true;
    Key.ASCVal := Ch;
    Key.Code := 0;
  End;

If (Key.ASCVal = ^C) and KbdMode.CtlCChk then Halt;

If (Key.ASCVal = ^S) and KbdMode.CtlSChk and (not KbdMode.Wait) then
  Begin
    Repeat Until KeyPressed;
    While KeyPressed do Ch :=ReadKey;
    Key.Got := false;
    Key.ASCII := true;
    Key.ASCVal := #0;
    Key.Code := 0;
  End;
End;
```

{———————————— Capitalizing ————————————}

{CapStr: Function to capitalize a string}

Function CapStr(Str: Str80):Str80;
Var
  StrLen,N: integer;
  OutStr : Str80;

Begin
  StrLen := Length(Str);
  OutStr := Str;
  For N := 1 to StrLen do
  Begin
    OutStr[N] := UpCase(OutStr[N]);
End;

{———————————— Video related ————————————}

Procedure RegularText;
Begin
  TextColor(15);
  TextBackground(0);
End;

Procedure DimText;
Begin
  TextColor(7);
  TextBackground(0);
End;

Procedure ReverseText;
Begin
  TextColor(0);
  TextBackground(7);
End;

Procedure BlackBack;
Begin
  TextBackground(0);
End;

Procedure GreyBack;
Begin
  TextBackground(7);
End;

{———————————— Parse ————————————}

{Version for Anonymous: pass separator string to Parse}

{ Parse: Simple minded routine to look at a string and separate into components

Rule:

- components are separated by characters in SepString.
}

```
Procedure Parse(Var ParseString: ParseStringType;
                    SepString: Str30;
                    Var Error: integer);

Var
  StrLen, Pointer, N, CompNum: integer;
  Ch: Char;
  InBlob: boolean;

Begin
  Error := 0;
  With ParseString do
  Begin
    QofComp := 0;
    StrLen := Length(Strg);
    For CompNum := 1 to MaxParseComp do
    Begin
      Comp[CompNum] := '';
    End;
    CompNum := 0;
    InBlob := false;
    For Pointer := 1 to StrLen do
    Begin
      Ch := Strg[Pointer];
      If Pos(Ch,SepString) = 0 then
      Begin                        {non separator}
        If Not InBlob then
        Begin
          InBlob := true;
          CompNum := CompNum+1;
          QofComp := CompNum;
          If CompNum > MaxParseComp then
          Begin
            QofComp := QofComp-1;
            Error := 1;
            Exit;
          End;
        End;
        Comp[CompNum] := Comp[CompNum]+Ch;
      End Else  {separator}
      Begin
        InBlob := False;
      End;
    End;
  End;
End;

{------------------------ GetChoice ------------------------}

Procedure GetChoice(Var Choic: char; Target: str80);
{Returns user's single-stroke keyboard choice, forced to be from target
string. Keyboard lower case is capitalized. Target string should contain no
lowercase letters!}

Begin
  Choic := '@';
  While Pos(Choic,Target) = 0 do
  Begin
```

```pascal
      If KeyPressed then
      Begin
        Choic := ReadKey;
        Choic := UpCase(Choic);
      End;
    End;
End;

Procedure X(Flag: char);
{Prints diagnostic flag followed by char argument}
Begin
  WriteLn('Diagnostic Flag ====>>> ',Flag);
End;

{---------------- File Handling Stuff --------------------------}

Function Exist(FileName: FName): boolean;
{Tells whether file FName exists}
Var
  Fil: File;
Begin
  Assign(Fil,FileName);
  {$I-}
  Reset(Fil);
  {$I+}
  Exist :=(IOresult = 0);
  Close(Fil);
End;

{---------------- Real to Str ---------------------}
Function RealToStr(RealNum: real;
                   FieldWidth:integer;
                   HiLim:real;     {Smallest Large float 1Esomething}
                   LoLim:real)     {Smallest small non-float 1Esomething}
                   :RTSType;
Var
  AbsNum: real;
  DecPlace: integer;
  StrNeg,DumStr: string[80];

Begin
  If RealNum = 0.0 then
  Begin
    DumStr := Copy('                              ',1,FieldWidth);
    DumStr[FieldWidth div 2] := '0';
  End Else
  Begin
    AbsNum := Abs(RealNum);
    If (AbsNum < HiLim) and (AbsNum >= LoLim) then
    Begin  {non-float routine}
      Str((0.0 - AbsNum):FieldWidth+FieldWidth:FieldWidth,StrNeg);
      DecPlace := Pos('-',StrNeg) - 1;
      Str(RealNum:FieldWidth:DecPlace,DumStr);
    End
    Else   {float routine}
      Str(RealNum:FieldWidth,DumStr);
  End;
  RealToStr := DumStr;
End;
```

{——————— System Date ———————}

```
Procedure Date(Var Date:DateType);

Var
  N:            Integer;
  Year, Month, Day: integer;
  YS, MS, DS: string[6];
  Regs: Registers;
Begin Regs.AX := $2A00;   {Get date}

MsDos(Regs);
  Year := Regs.CX;
  Month := Hi(Regs.DX);
  Day := Lo(Regs.DX);

Str(Year:5,YS);
  Str(Month:6,MS);
  Str(Day:5,DS);

Date := Copy(MS,5,2)+'-'+Copy(DS,5,2)+'-'+Copy(YS,5,2);

For N := 1 to 8 do If Date[N] = ' ' then Date[N] := '0';

End;
```

{——————— System Time ———————}

```
Procedure SysTime(var Hr,Min,Sec,Frac:integer);
  R:registers;
Begin
  With R do
  Begin
    AX := $2C00;
    Msdos(R);
    Hr := hi(CX);
    Min := lo(CX);
    Sec := hi(DX);
    Frac := lo(DX);
  End;
End;
```

{——————— Cursor Stuff ———————}

```
Procedure CursorOff;

{ if you need to keep the cursor off after a ClrScr or screen mode
    change you will need to call this routine again }

Var
  Reg : Registers;

begin { CursorOff }
  Reg.AX := $0100;
  Reg.CX := $0800;
  Intr($10,Reg);
end; { CursorOff }
```

```
procedure CursorOn;    { normal cursor attributes }

Var
  Reg : Registers;

begin { CursorOn }
  Reg.AX := $0100;
  Reg.CX := $0107;            {made big! was $0607}
  Intr($10,Reg);
end; { CursorOn }

Procedure PutAtXY(X,Y: integer; Ch: char);
{X,Y start from 1,1}
Var
  MemAddr: integer;

Begin
  MemAddr := 2*((X-1)+(Y-1)*80);
  Mem[ScreenSeg:MemAddr] := Ord(Ch);
End;

{----------------- Squeeze Out Blanks -----------------------}

Function Squeeze(InStr:Str80):Str80;
Var N:integer;
    OutStr: Str80;

Begin
  OutStr := '';
  For N := 1 to Length(InStr) do
  Begin
    If InStr[N] <> ' ' then
    OutStr := OutStr+InStr[N];
  End;
  Squeeze := OutStr;
End;
Procedure ErrDo(Er: integer;S1,S     255);
Begin
  If Er <> 0 then
  Begin
    WriteLn(S1);
    WriteLn(S2);
    WriteLn('Quitting....');
    Halt;
  End;
End;

End.
Unit ThTable;   {related to loading table for translating thermistor
                values}
interface
uses miscunit;
Const
  THTabLen = 2000;

Type
  ValTypeType = (Res,Temp);
```

```
Var
   ThTab: array[1..ThTabLen,Res..Temp] of real;

Procedure LoadTable;

Procedure Res2Temp(R:real;Var T:real; Var Err: integer);

{--------------------------- implementation ---------------------------}
implementation Procedure LoadTable;
{notes: ThTab is expected to contain less than ThTabLen entries,
and they should be in descending order of resistance value}

Var
  Infile: text;
  Infilename: string[80];
  N,Err: integer;
  P:ParseStringType;
  RTemp,RRes: real;

Begin
  For N := 1 to ThTabLen do
  Begin
    ThTab[N,Res] := 1E6;
    ThTab[N,Temp] := -273;
  End;

Infilename := 'TTable';
  Assign(Infile,Infilename);
  Reset(Infile);

N := 0;
  While not EOF(Infile) do
  Begin
    ReadLn(Infile,P.Strg);
    Parse(P,' /,',Err);
    Errdo(Err,'Error in loading ThTab file',P.Strg);
    If (P.QofComa > 1) and (P.Como[1][1] <> ';') then
    Begin
      N := N + 1;
      Val(P.Como[1],RTemp,Err);
      Errdo(Err,'Error in loading ThTab file',P.Strg);
      Val(P.Como[2],RRes,Err);
      Errdo(Err,'Error in loading ThTab file',P.Strg);
      ThTab[N,Temp] := RTemp;
      ThTab[N,Res] := RRes;

End;
  End;
  Close(Infile);
```

```
Procedure Res2Temp(R:real;Var T:r    : Var_Err: integer);
Var
   N: integer;
   done: boolean;

Begin
   Err := 0;
   N := 0;
   done := false;
   Repeat
      N := N + 1;
      If ThTab[N,Res] < R then
      Begin
         done := true;
         T := ThTab[N,Temp];
      End;
   Until done or (N = ThTabLen);
   If not done then
   Begin
      T := 0;
      Err := 1;
   End;
End;
End.
```

What is claimed is:

1. A workpiece-temperature-compensated dimensional measuring device comprising:

a three-point snap gauge having two fixed shoes and a moveable measuring shoe
   for, at a first time, measuring a dimension of a reference standard as a first dimension, and
   for, at a second time, measuring a dimension of an arbitrarily-sized workpiece as a second dimension;

first thermal sensing means
   held at the first time by the gauge means in thermal communication with a reference standard for measuring a temperature of the reference standard as a first temperature, and
   held at the second time by the gauge means in thermal communication with the workpiece for measuring a temperature of the workpiece as a second temperature; and computational means
   for receiving at the first time the first dimension from the gauge means and the first temperature from the first thermal sensing means and for producing, in consideration of a predetermined dimensional sensitivity of the reference standard to temperature variations about a first predetermined reference temperature that is not equal to the first temperature, that temperature-normalized dimension that the reference standard would measure to and by the selfsame gauge means upon such times as the reference standard was to be at the first predetermined reference temperature, therein to calibrate the gauge means, and
   for receiving at the second time the second dimension from the calibrated gauge means and the second temperature from the first thermal sensing means and for producing, in consideration of a predetermined dimensional sensitivity of the workpiece to temperature variations about the first predetermined reference temperature, that temperature-normalized dimension that the workpiece would measure to and by the selfsame gauge means upon such times as the workpiece was to be at the first predetermined reference temperature.

2. The workpiece-temperature-compensated dimensional measuring device according to claim 1 wherein a one of the shoes of the snap gauge holds the first thermal sensing means in thermal communication with the workpiece.

3. The workpiece-temperature-compensated dimensional measuring device according to claim 1 wherein the three point snap gauge is thermally insulated from a human hand by which it is held during use to measure the workpiece.

4. A self-temperature-compensated and workpiece-temperature-compensated dimensional measuring device comprising:

a frame that exhibits a first predetermined dimensional sensitivity to temperature differences from a reference temperature; the frame comprising
a "C" frame having two fixed shoes,
dimensional measurement means movably referenced to the frame for measuring a dimension of a workpiece relative to the frame;
wherein the dimensional measurement means serves as a moveable third shoe to the "C" frame,
wherein the "C" frame and its shoes including the dimensional measuring means constitute in combination a three point snap gauge;
first temperature measurement means in thermal communication with the frame for measuring a first temperature of the frame that is not equal to the first predetermined reference temperature;
second temperature measurement means in thermal communication with the workpiece for measuring the second temperature of the workpiece; and
computational means for receiving the measured workpiece dimension from the dimensional measurement means and the measured frame first temperature from the first temperature measurement means, and for calculating, in consideration of the first predetermined dimensional sensitivity of the frame to variations in temperature about a predetermined reference temperature, the temperature-normalized dimension that the workpiece would measure by the dimensional measurement means relative to the frame upon such times as the frame was at the predetermined, reference temperature even though the frame is at a first temperature not equal to the first predetermined reference temperature, and further for receiving the measured workpiece second temperature from the second temperature measurement means and for producing, in further consideration of a second predetermined dimensional sensitivity of the workpiece to variations in temperature about a predetermined reference temperature, that temperature-normalized dimension that the workpiece would measure by the dimensional measurement means relative to the frame upon such times as both the workpiece and the frame were at the predetermined, reference, temperature.

5. The self-temperature-compensated dimensional measuring device according to claim 4 wherein a one of the two fixed shoes of the three point snap gauge holds the second temperature measurement means in thermal communication with the workpiece.

6. The self-temperature-compensated dimensional measuring device according to claim 4 wherein the three point snap gauge is thermally insulated from a human hand by which it is held during use for measuring the workpiece.

7. A workpiece-temperature-compensated and self-temperature-compensated measurement device comprising:
a frame that exhibits a first predetermined dimensional sensitivity $X_{Gauge}$ to deviations from a first reference temperature $T_{GStd}$, the frame comprising:
a snap gauge frame exhibiting contact with the workpiece at at least three shoe points;
an indicator of displacement referenced to the frame and displaced relative thereto by a workpiece for measuring relative to the frame a quantitative dimension of the workpiece $G_{Wkpc}$, the workpiece exhibiting a second predetermined dimensional sensitivity $X_{Wkpc}$ to deviations from a second reference temperature $T_{Std}$ different from the first reference temperature $T_{GStd}$;
first temperature measurement means in thermal contact with the frame for measuring a first temperature $T_{GWkpc}$ of the frame;
second temperature measurement means, held by the frame in thermal contact with the workpiece, for measuring a second temperature $T_{Wkpc}$ of the workpiece; and
computational means for receiving the measured workpiece dimension $G_{Wkpc}$, the measured first temperature $T_{GWkpc}$, and the measured second temperature $T_{Wkpc}$ and for calculating, in consideration of the first and the second predetermined dimensional sensitivities $X_{Gauge}$ and $X_{Wkpc}$ respectively of the frame and of the workpiece to deviations respectively from the first reference temperature $T_{GStd}$ and the second reference temperature $T_{Std}$, the workpiece-temperature-compensated frame-temperature-compensated quantitative dimension
$G_{Wkpc} + [(T_{Std} - T_{Wkpc}) \times X_{Wkpc}] - [(T_{GStd} - T_{GWkpc}) \times X_{Gauge}]$ that the workpiece would measure upon such times as both it and the frame were at the reference temperature.

8. The measurement device according to claim 7 wherein the indicator of displacement comprises:
an electronic displacement indicator displaced relative to the snap gauge frame as a moveable shoe thereof by the positioning of the snap gauge frame about the workpiece, and producing an electrical signal representative of the workpiece dimension;
wherein the electrical signal is receivable by the computational means.

9. An apparatus for the temperature-compensated dimensional measurement of a workpiece that is subject to a first predetermined dimensional variation with temperature deviation about a reference temperature, the measurement apparatus comprising:
a gauge for producing at a first time a first signal representative of a dimension of a reference standard, and at a second time a second signal representative of a dimension of a workpiece wherein the gauge is in the configuration of a snap gauge for measuring an outside diameter of a workpiece;
a first temperature sensor for producing at the first time a third signal representative of a temperature of the reference standard, and at the second time a fourth signal representative of the temperature of the workpiece;
a computational means
receiving at the first time the first signal from the gauge and the third signal from the first temperature sensor for computing, in consideration of a predetermined dimensional variation of the reference standard with variation in temperature about a reference temperature, a first temperature-compensated dimension that the reference standard would measure to the gauge should the reference standard be at the reference temperature even though the gauge is not, in fact, actually at the reference temperature,
for using the first temperature-compensated dimension to calibrate the gauge, and
receiving at the second time the second signal from the gauge and the fourth signal from the first temperature sensor for computing, in consideration of a predetermined dimensional variation of the workpiece with temperature about the reference temperature a calibrated workpiece-temperature-compensated dimension that the workpiece would measure to the gauge should the workpiece be at the reference temperature even though the workpiece is not, in fact, actually at the reference temperature.

* * * * *